(12) United States Patent
Fjeldheim et al.

(10) Patent No.: US 12,240,697 B2
(45) Date of Patent: *Mar. 4, 2025

(54) VEHICLE FOR AN AUTOMATED STORAGE AND RETRIEVAL SYSTEM

(71) Applicant: Autostore Technology AS, Nedre Vats (NO)

(72) Inventors: Ivar Fjeldheim, Haugesund (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/339,580

(22) Filed: Jun. 22, 2023

(65) Prior Publication Data
US 2023/0339683 A1 Oct. 26, 2023

Related U.S. Application Data

(63) Continuation of application No. 17/817,513, filed on Aug. 4, 2022, now Pat. No. 11,718,477, which is a (Continued)

(30) Foreign Application Priority Data

Oct. 19, 2017 (NO) .................................. 20171676

(51) Int. Cl.
*B65G 1/06* (2006.01)
*B65G 1/04* (2006.01)
*B65G 59/02* (2006.01)

(52) U.S. Cl.
CPC ........... *B65G 1/065* (2013.01); *B65G 1/0414* (2013.01); *B65G 1/0464* (2013.01); *B65G 59/02* (2013.01)

(58) Field of Classification Search
CPC ..... B65G 1/065; B65G 1/0414; B65G 1/0464; B65G 59/02
See application file for complete search history.

(56) References Cited

U.S. PATENT DOCUMENTS

| | | | |
|---|---|---|---|
| 4,088,232 A | 5/1978 | Lilly | |
| 7,920,962 B2 * | 4/2011 | D'Andrea | ............ G05D 1/0212 701/410 |

(Continued)

FOREIGN PATENT DOCUMENTS

| | | |
|---|---|---|
| EP | 3192751 A1 | 7/2017 |
| NO | 317366 B1 | 10/2004 |

(Continued)

OTHER PUBLICATIONS

Marcos Moreno Rey, Examination Report for European Patent Application No. 21211321.1, mailed Sep. 11, 2024, 5 pages, European Patent Office, Rijswijk, Netherlands.

(Continued)

*Primary Examiner* — Saul Rodriguez
*Assistant Examiner* — Ashley K Romano
(74) *Attorney, Agent, or Firm* — Baker Botts L.L.P.

(57) ABSTRACT

An automated storage and retrieval system includes a plurality of storage container handling vehicles. Each vehicle includes a vehicle body, a thereto connected wheel assembly configured to guide the vehicle along the track system, a container picking device for releasably attaching to a storage container, which include one or more arms. The configuration of the container picking device is such that it is movable between a first lifting position enabling the container picking device to lift at least one storage container from a position beyond a horizontal extent of the vehicle body and a second transport position enabling the container picking device to hold the at least one storage container at least partly within (Continued)

the horizontal extent of the vehicle body and above the vehicle body.

14 Claims, 11 Drawing Sheets

Related U.S. Application Data continuation of application No. 16/756,853, filed on Apr. 17, 2020, now Pat. No. 11,465,844, which is a continuation of application No. PCT/EP2018/077907, filed on Oct. 12, 2018.

(56) References Cited

U.S. PATENT DOCUMENTS

| | | |
|---|---|---|
| 9,427,874 B1 | 8/2016 | Rublee |
| 9,589,353 B2 | 3/2017 | Halata |
| 9,650,215 B2 | 5/2017 | Girtman |
| 9,714,139 B1 | 7/2017 | Aggarwal |
| 9,785,911 B2 | 10/2017 | Galluzzo et al. |
| 9,881,823 B2 | 1/2018 | Doherty et al. |
| 9,995,047 B2 | 6/2018 | Raman et al. |
| 10,710,807 B2 * | 7/2020 | Voloskov ............. B65G 1/0492 |
| 10,781,043 B1 * | 9/2020 | Kalm ................. B65G 1/0464 |
| 10,882,540 B2 * | 1/2021 | Stadie ...................... B08B 1/12 |
| 10,940,999 B2 * | 3/2021 | Kalouche ............ B65G 47/918 |
| 10,947,042 B2 * | 3/2021 | Hognaland ............ B65G 1/065 |
| 10,970,866 B2 | 4/2021 | Diankov et al. |
| 11,148,890 B2 | 10/2021 | Wagner et al. |
| 11,235,930 B2 * | 2/2022 | Bastian, II ........... B25J 15/0616 |
| 11,318,499 B2 * | 5/2022 | Kalouche ............ B65G 1/1378 |
| 11,338,996 B2 * | 5/2022 | Zhu ..................... B65G 1/0492 |
| 11,492,203 B2 * | 11/2022 | Clark .................. B65G 1/0464 |
| 11,891,289 B2 * | 2/2024 | Bangalore Srinivas ..................... B66F 7/0666 |
| 2016/0194151 A1 | 7/2016 | Lindbo et al. |
| 2018/0057263 A1 | 3/2018 | Beer |
| 2018/0265291 A1 | 9/2018 | Wagner et al. |
| 2018/0319590 A1 | 11/2018 | Lindbo et al. |
| 2019/0092570 A1 | 3/2019 | Macdonald et al. |
| 2019/0129399 A1 | 5/2019 | Wagner et al. |
| 2019/0161273 A1 | 5/2019 | Ingram-Tedd et al. |
| 2019/0225436 A1 | 7/2019 | Lindbo et al. |
| 2019/0291955 A1 | 9/2019 | Bastian, II |
| 2020/0017314 A1 | 1/2020 | Rose et al. |
| 2020/0031575 A1 | 1/2020 | Hognaland |
| 2020/0094997 A1 | 3/2020 | Menon et al. |
| 2021/0032031 A1 | 2/2021 | Kalouche |
| 2021/0032034 A1 | 2/2021 | Kalouche |
| 2021/0130095 A1 | 5/2021 | Ueda et al. |
| 2021/0155407 A1 | 5/2021 | Austrheim et al. |
| 2021/0170895 A1 | 6/2021 | Austrheim et al. |

FOREIGN PATENT DOCUMENTS

| | | |
|---|---|---|
| WO | 0162656 A2 | 8/2001 |
| WO | 2013/167907 A1 | 11/2013 |
| WO | 2014/075937 A1 | 5/2014 |
| WO | 2014/090684 A1 | 6/2014 |
| WO | 2015/193278 A1 | 12/2015 |
| WO | 2016063197 A1 | 4/2016 |
| WO | 2016/120075 A1 | 8/2016 |
| WO | 2016/198467 A1 | 12/2016 |
| WO | 2016/198565 A1 | 12/2016 |
| WO | 2017081275 A1 | 5/2017 |

OTHER PUBLICATIONS

Anonymous, Anonymous Objections from Third Parties for European Patent Application No. 21211321.1, mailed Aug. 8, 2022, 5 pages (including translation), European Patent Office, Rijswijk, Netherlands.

* cited by examiner

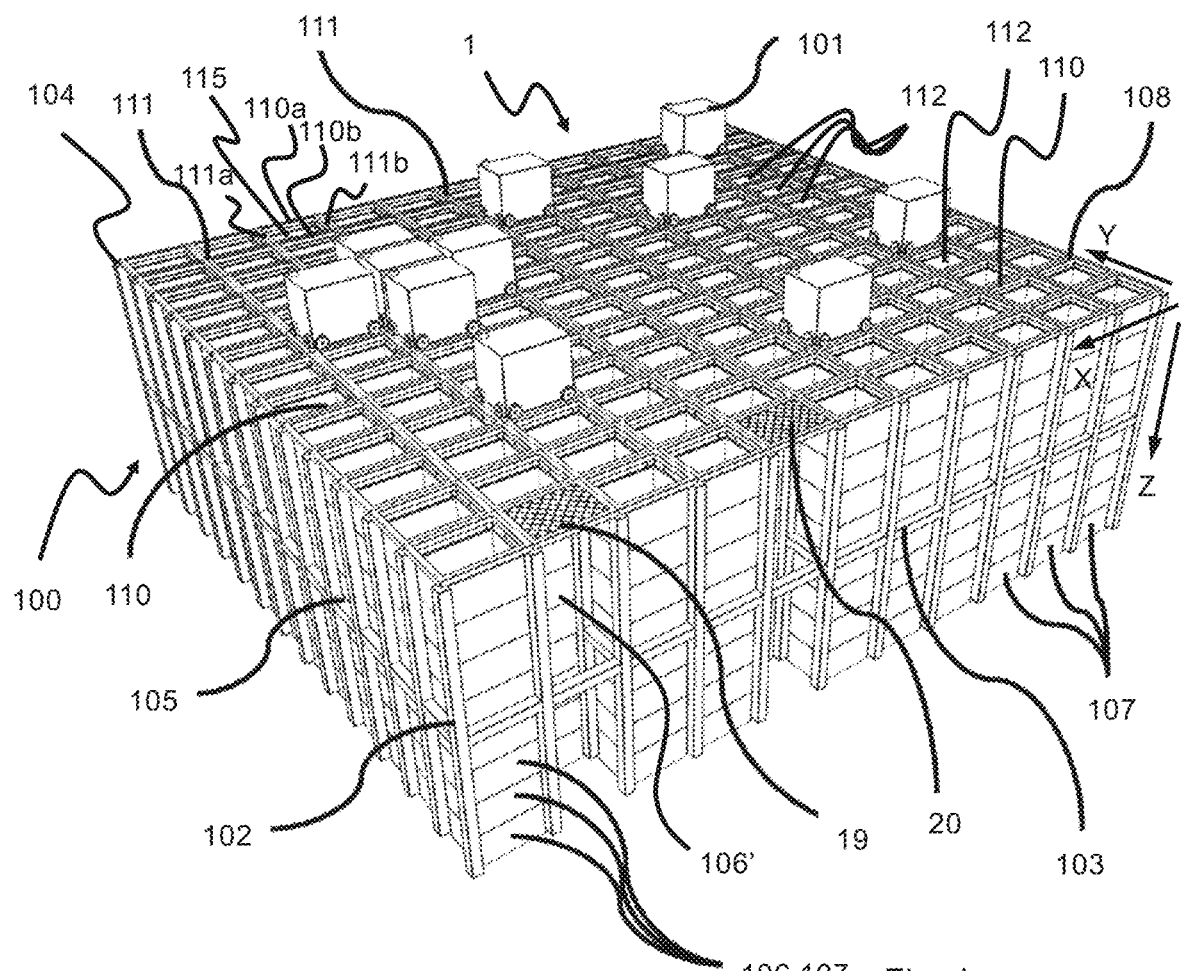
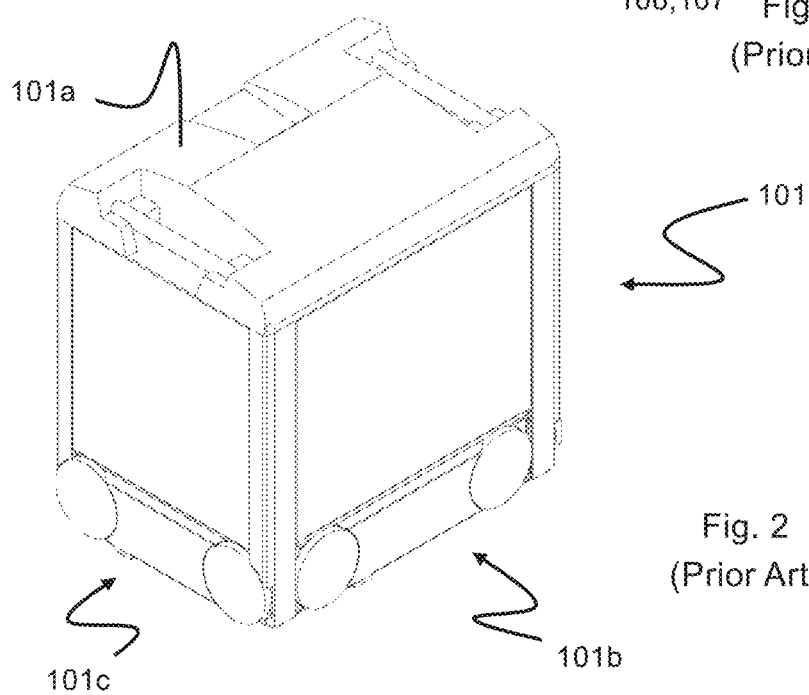
Fig. 1 (Prior Art)
Fig. 2 (Prior Art)

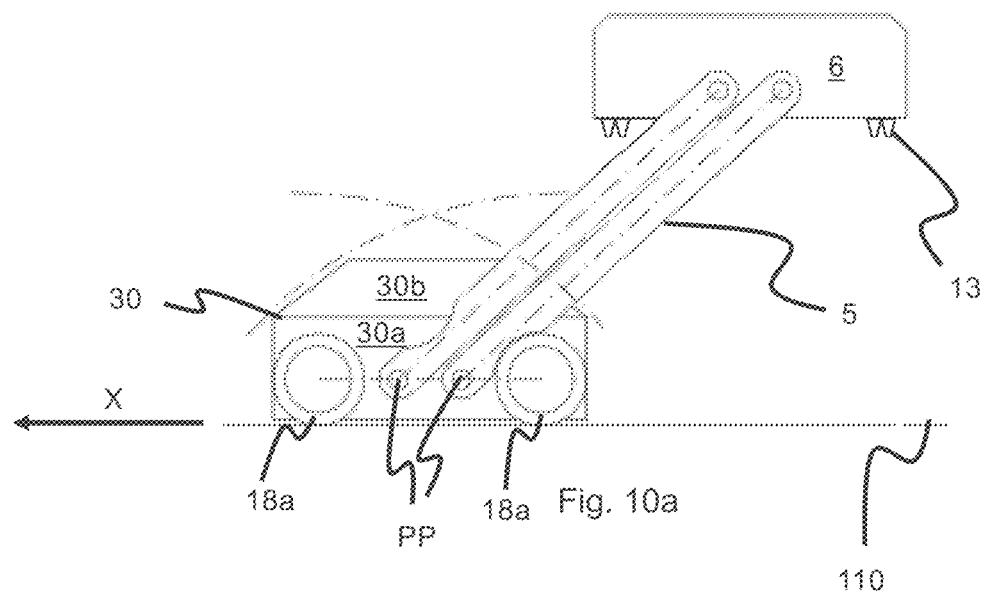
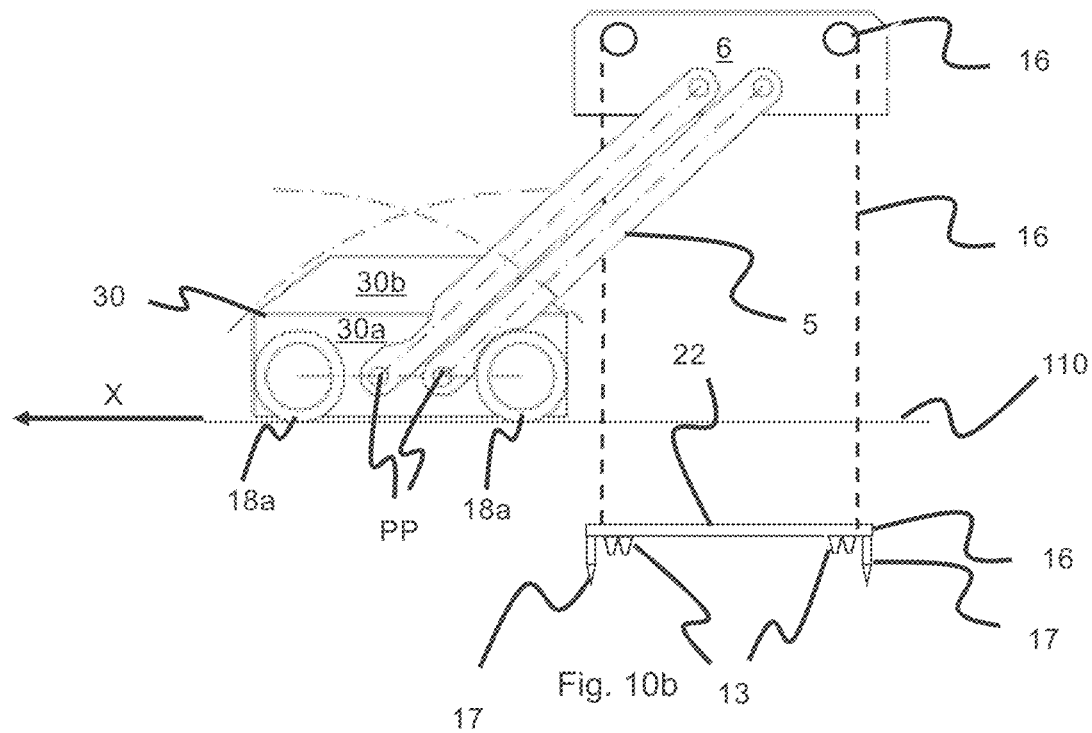

VEHICLE FOR AN AUTOMATED STORAGE AND RETRIEVAL SYSTEM

TECHNICAL FIELD

The present invention relates to an automated storage and retrieval system, a vehicle for lifting and moving storage containers stacked in stacks within the system and a method thereof.

BACKGROUND

FIG. 1 discloses a typical prior art automated storage and retrieval system 1 with a framework structure 100 and FIG. 2 discloses a prior art container handling vehicle 101 of such a system 1.

The framework structure 100 comprises a plurality of upright members 102 and a plurality of horizontal members 103 which are supported by the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106, also known as bins, are stacked one on top of another to form stacks 107. Each storage container 106 may typically hold a plurality of product items (not shown), and the product items within a storage container 106 may be identical, or may be of different product types depending on the application. The storage grid 104 guards against horizontal movement of the stacks 107 of storage containers 106, and guide s vertical movement of the containers 106, but does normally not otherwise support the storage containers 106 when stacked.

The horizontal members 103 comprise a rail system 108 arranged in a grid pattern across the top of the storage columns 105, on which rail system 108 a plurality of container handling vehicles 101 are operated to raise storage containers 106 from and lower storage containers 106 into the storage columns 105, and also to transport the storage containers 106 above the storage columns 105. The rail system 108 comprises a first set of parallel rails 110 arranged to guide movement of the container handling vehicles 101 in a first direction X across the top of the frame structure 100, and a second set of parallel rails 111 arranged perpendicular to the first set of rails 110 to guide movement of the container handling vehicles 101 in a second direction Y, which is perpendicular to the first direction X. In this way, the rail system 108 defines grid columns 112 above which the container handling vehicles 101 can move laterally above the storage columns 105, i.e. in a plane which is parallel to the horizontal X-Y plane.

Each container handling vehicle 101 comprises a vehicle body 101a, and first and second sets of wheels 101b, 101c which enable the lateral movement of the container handling vehicle 101 in the X direction and in the Y direction, respectively. In FIG. 2 two wheels in each set are visible. The first set of wheels 101b is arranged to engage with two adjacent rails of the first set 110 of rails, and the second set of wheels 101c is arranged to engage with two adjacent rails of the second set 111 of rails. Each set of wheels 101b, 101c can be lifted and lowered, so that the first set of wheels 101b and/or the second set of wheels 101c can be engaged with the respective set of rails 110, 111 at any one time.

Each container handling vehicle 101 also comprises a lifting device (not shown) for vertical transportation of storage containers 106, e.g. raising a storage container 106 from and lowering a storage container 106 into a storage column 105. The lifting device comprises a gripping device (not shown) which is adapted to engage a storage container 106, and which gripping device can be lowered from the vehicle body 101a so that the position of the gripping device with respect to the vehicle body 101a can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the embodiment disclosed in FIG. 1, Z=8 identifies the lowermost, bottom layer of the grid 104. Consequently, as an example, and using the Cartesian coordinate system X, Y, Z indicated in FIG. 1, the storage container identified as 106' in FIG. 1 can be said to occupy grid location or cell X=10, Y=2, Z=3. The container handling vehicles 101 can be said to travel in layer Z=0 and each grid column 112 can be identified by its X and Y coordinates.

Each container handling vehicle 101 comprises a storage compartment or space for receiving and stowing a storage container 106 when transporting the storage container 106 across the grid 104. The storage space may comprise a cavity arranged centrally within the vehicle body 101a, e.g. as is described in WO2014/090684A1, the contents of which are incorporated herein by reference.

Alternatively, the container handling vehicles 101 may have a cantilever construction, as is described in NO317366, the contents of which are also incorporated herein by reference.

The container handling vehicles 101 may have a footprint, i.e. an extension in the X and Y directions, which is generally equal to the lateral or horizontal extension of a grid column 112, i.e. the extension of a grid column 112 in the X and Y directions, e.g. as is described in WO2015/193278A1, the contents of which are incorporated herein by reference.

Alternatively, the container handling vehicles 101 may have a footprint which is larger than the lateral extension of a grid column 112, e.g. as is disclosed in WO2014/090684A1.

The rail system 108 may be a single rail system, as is shown in FIG. 3.

Alternatively, the rail system 108 may be a double rail system, as is shown in FIG. 4, thus allowing a container handling vehicle 101 having a footprint generally corresponding to the lateral extension of a grid column 112 to travel along a row of grid columns even if another container handling vehicle 101 is positioned above a grid column neighboring that row. Both the single and double rail system forms a grid pattern in the horizontal plane P comprising a plurality of rectangular and uniform grid locations or grid cells 122, where each grid cell 122 comprises a grid opening 115 being delimited by a pair of tracks 110a,110b of the first tracks 110 and a pair of tracks 111a,111b of the second set of tracks 111. In FIG. 4 the grid cell 122 is indicated by a dashed box.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122.

In a storage grid 104, a majority of the grid columns 112 are storage columns 105, i.e. grid columns 105 where storage containers 106 are stored in stacks 107. However, a grid 104 normally has at least one grid column 112 which is used not for storing storage containers 106, but which comprises a location where the container handling vehicles 101 can drop off and/or pick up storage containers 106 so that they can be transported to an access station 32 (see FIGS. 12-14) where the storage containers 106 can be accessed from outside of the grid 104 or transferred out of or into the grid 104. Within the art, such a location is normally referred to as a "port" and the grid column 112 in which the port is located may be referred to as a port column 19,20.

The grid 104 in FIG. 1 comprises two port columns 19 and 20. The first port column 19 may for example be a dedicated drop-off port column where the container handling vehicles 101 can drop off storage containers to be transported to an access or a transfer station (23), and the second port column 20 may be a dedicated pick-up port column where the container handling vehicles 101 can pick up storage containers 106 that have been transported to the grid 104 from an access or a transfer station 32.

The access station 32 may typically be a picking or a stocking station where product items are removed from or positioned into the storage containers 106. In a picking or a stocking station 32, the storage containers 106 are normally never removed from the automated storage and retrieval system 1, but are returned into the grid 104 once accessed. A port can also be used for transferring storage containers out of or into the grid 104, e.g. for transferring storage containers 106 to another storage facility (e.g. to another grid or to another automated storage and retrieval system), to a transport vehicle (e.g. a train or a lorry), or to a production facility.

A conveyor system comprising conveyors is normally employed to transport the storage containers between the ports 19,20 and the access station 32.

If the port and the access station 32 are located at different levels, the conveyor system may comprise a lift device for transporting the storage containers 106 vertically between the port 19,21 and the access station 32.

The conveyor system may be arranged to transfer storage containers 106 between different grids, e.g. as is described in WO2014/075937A1, the contents of which are incorporated herein by reference.

WO2016/198467A1, the contents of which are incorporated herein by reference, disclose an example of a prior art access system having conveyor belts (FIGS. 5a and 5b) and a frame mounted track (FIGS. 6a and 6b) for transporting storage containers between ports and work stations where operators can access the storage containers.

When a storage container 106 stored in the grid 104 disclosed in FIG. 1 is to be accessed, one of the container handling vehicles 101 is instructed to retrieve the target storage container 106 from its position in the grid 104 and transport it to the drop-off port 19. This operation involves moving the container handling vehicle 101 to a grid location above the storage column 105 in which the target storage container 106 is positioned, retrieving the storage container 106 from the storage column 105 using the container handling vehicle's 101 lifting device (not shown), and transporting the storage container 106 to the drop-off port 19. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system 1 may have container handling vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

When a storage container 106 is to be stored in the grid 104, one of the container handling vehicles 101 is instructed to pick up the storage container 106 from the pick-up port 20 and transport it to a grid location above the storage column 105 where it is to be stored. After any storage containers positioned at or above the target position within the storage column stack 107 have been removed, the container handling vehicle 101 positions the storage container 106 at the desired position. The removed storage containers may then be lowered back into the storage column 105, or relocated to other storage columns.

For monitoring and controlling the automated storage and retrieval system 1, e.g. monitoring and controlling the location of respective storage containers 106 within the grid 104; the content of each storage container 106; and the movement of the container handling vehicles 101 so that a desired storage container 106 can be delivered to the desired location at the desired time without the container handling vehicles 101 colliding with each other, the automated storage and retrieval system 1 comprises a control system which typically is computerized and which typically comprises a database for keeping track of the storage containers 106.

A problem associated with known automated storage and retrieval systems 1 is that the area surrounding the ports 19,20 may become congested with container handling vehicles 101 instructed to drop off or pick up storage containers 106. This may seriously impede the operation of the automated storage and retrieval system 1. In small systems, this situation may possibly be alleviated by adding ports to the grid, as this will allow the container handling vehicles 101 to be distributed among a larger number of ports in order to avoid congestion. However, if ports are added, the conveyor system infrastructure must normally be increased. This requires space, which may not necessarily be available. Also, adding conveyor system infrastructure is costly.

Furthermore, the current trend within the automated storage and retrieval system industry is that there is an increasing demand for larger storage grids. Since the number of storage containers stored in a grid generally scales as the volume of the grid, but the space available for ports generally scales as the surface of the grid, increasing the number of ports will not necessarily solve the congestion problem when the grid size increases.

Another problem with prior art automated storage and retrieval systems using storage container vehicles with single cell design is that these vehicles necessitates a container receiving cavity within the vehicle body itself and which must be open towards the underlying grid. Strict space constrains are therefore set as to the locations and sizes of necessary vehicle components, e.g. lifting devices and wheel displacement means. In order to maximize the horizontal cross section of the cavity, the prior art single cell vehicles arrange at least some of the vehicle components above the cavity (see e.g. WO 2015/193278 A1) and/or within the wheels (see e.g. WO 2016/120075 A1), a solution that results in high complexity and cost.

In addition, the single cell vehicles may handle only one container in each operation, thereby setting a limitation of the rate containers may be handled in operating the above mentioned storage and retrieval system.

In view of the above, it is desirable to provide an automated storage and retrieval system, and a method for operating such a system, that solve or at least mitigate one or more of the aforementioned problem related to use of prior art storage and retrieval systems.

SUMMARY OF THE INVENTION

The present invention is set forth and characterized in the main claims, while the dependent claims describe other characteristics of the invention.

In particular, the invention concerns an automated storage and retrieval system comprising a track system comprising a first set of parallel tracks arranged in a horizontal plane (P) and extending in a first direction (X) and a second set of parallel tracks arranged in the horizontal plane (P) and extending in a second direction (Y) which is orthogonal to the first direction (X). As a result, the first and second sets of tracks form a grid pattern in the horizontal plane (P) comprising a plurality of adjacent grid cells, each comprising a grid opening defined by a pair of neighboring tracks of the first set of tracks and a pair of neighboring tracks of the second set of tracks. The system further comprises a plurality of stacks of storage containers arranged in storage columns located beneath the track system, vertically below the grid openings and a vehicle, preferably a plurality of vehicles, for lifting and moving storage containers stacked in the stacks. Each vehicle comprises a vehicle body, a thereto connected wheel assembly configured to guide the vehicle along the track system either in the first direction (X), in the second direction (Y) or in both, a container picking device for releasably attaching to a storage container. The container picking device further comprises one or more arms, preferably pivot arms comprising a first end pivotally connected to the vehicle body at a fixed or movable pivot point (PP) and a second, distal end. The configuration of the container picking device is such that it is movable in a pivoting motion of the pivot arm about the pivot point between a first, lifting position enabling the container picking device to lift at least one storage container from a position beyond the horizontal extent of the vehicle body and a second, transport position enabling the container picking device to hold the at least one storage container at least partly within the horizontal extent of the vehicle body, above the vehicle body. 'Horizontal extend' is herein defined as the outermost horizontal boundaries of the vehicle body. Further, 'vehicle body' is herein defined as any common connection point for the wheel assembly and the container picking device, and may include any open frames, protective box, etc. The arms, for example in form of pivot arms in respective pivot points, may be directly or indirectly connected to said vehicle body.

The pivot arm, or pivot arms, may rotate around an axis perpendicular to the horizontal plane (P), for example a pivot arm revolving around a vertical axis at the periphery of the vehicle body. However, in an advantageous configuration the container picking device is configured such that the pivotal movement of the pivot arm is restricted to a vertical plane oriented in the first direction (X).

The container picking device preferably comprises an attachment device pivotally connected to the pivot arm and configured to allow releasable attachment to the at least one storage container. Such an attachment device may further comprise an attachment body pivotally connected to the pivot arm and a gripping device/engagement device connected to the attachment body, for releasably gripping/engaging the at least one storage container. The maximum horizontal extent of the attachment device should preferably cover at least the horizontal extent of a storage container to be picked in order to create a high stability in the picking process. If several containers should be picked in a single picking operation, the horizontal extent should preferably at least cover the number of containers to be picked. High stability refers to the stability of the withdrawal of the container from the storage column. By ensuring that the attachment device has a horizontal extent that is equal to the horizontal extent of the container, the lifting unit be operated on or near the horizontal boundaries of the container.

In order to further increase the stability of the picking operation the container picking device preferably comprises a first pivot arm pivotally connected to a first side of the vehicle body aligned in the first direction (X), for example a first side wall, and a second pivot arm pivotally connected to a second side of the vehicle body aligned in the first direction (X), for example a second side wall. In this exemplary configuration, the first and second pivot arms may advantageously be pivotally connected to respective side walls of the attachment body aligned in the first direction (X). The higher stability is achieved inter alia since the above disclosed arrangement of the pivot arms prevent undesired twisting during operation.

The container picking device may further comprise two mutually parallel first pivot arms pivotally connected to a first side wall of the vehicle body aligned in the first direction (X). Further, two mutually parallel second pivot arms may be pivotally connected to a second side wall of the vehicle body aligned in the first direction (X). These configurations increase further the stability of the lifting operation i.a. since the mutually parallel pivot arms ensures that the lifting unit remains horizontal.

In one embodiment of the invention, each vehicle has a footprint, at least in one direction, that is equal to, or less than, the horizontal extent of a grid cell of the underlying track system. With this embodiment the vehicle may pass each other on neighboring cells on each lateral/horizontal side of the vehicle body when the pivot arm(s) is/are in the transport position resulting in a horizontal extent of the container picking device which do not go beyond the horizontal extent of the vehicle body.

In an alternative embodiment of the invention, each vehicle has a footprint of the vehicle that is equal to, or near equal to, the horizontal extension of a grid cell of the underlying track system times an integer of two or more.

The wheel assembly may include any means capable of moving the vehicle in the desired direction on the track system. However, in a preferred configuration the wheel assembly comprises a first set of wheels for engaging with the first set of tracks to guide movement of the vehicle in the first direction (X). For example, the first set of wheels may comprise four wheels arranged at or near each corner of the vehicle body, all oriented with their rotational axis in the horizontal plane (P), perpendicular to the first direction (X).

The vehicle body may be divided into a lower part onto which the wheel assembly is rotatably mounted and an upper part located above the wheel assembly (18). In order to ensure free pivoting movements of the container picking device, it may further be advantageous to design the upper part with a continuous or stepwise reduction in horizontal extent, for example with an inclination inwards along the first direction (X) having an inclination angle relative to the horizontal plane (P) that may be equal on both side of the vehicle body in the first direction (X). If the wheel assembly comprises four wheels, each wheel may advantageously be arranged at or near the corners of the lower part and further arranged so that they do not interfere with the pivotal movement of the pivot arms/storage container. Note that the term wheel assembly may comprise any means ensuring movements of the vehicle, for example a set of belts, a set of wheels being passive, i.e. set in motion by external motors, a set of wheels containing one or more hub motors, electronics related to the motors, etc. Any reference to wheels may be replaced by belts of any kind.

The pivot point (PP) or pivot points (PP) may in an exemplary configuration be located at the lower part of the vehicle body, in between two wheels of the first set of wheels.

The pivot arms may be configured with arcuate recesses partly encapsulating part of the wheels and/or part of the wheel axle during pivoting in order to allow the pivot arm to be wider. Such recesses would also allow for the pivot point to be lower down on the vehicle body while still allowing a suitably long reach when pivoted. Further, the recesses could also act as a brake on the wheel to ensure the vehicle to not to move as the container is lowered.

In another embodiment of the invention the attachment device comprises, in addition to the attachment body pivotally connected to the pivot arm and the gripping device/ engagement device configured to releasably grip/engage at least one storage container, a storage container lift mechanism connected to the attachment body. The storage container lift mechanism may in this embodiment be configured to raise and lower the at least one storage container from a position on or within a grid column to a position fully above the track system. The gripping device may be arranged on the lower end of the storage container lift mechanism.

In order to provide sufficient torque to the pivot arm or pivot arms, the vehicle body may be equipped with one or more pivot arm motors, one or more arm shafts, and, if necessary according to the specific configuration choice, gearing means to provide torque from the shaft(s) to the pivot arms. The strength of the applied torque should at least enable lifting of a single void storage container between the picking position and the transport position.

In yet another embodiment of the invention the wheel assembly comprises a first set of wheels for engaging with the first set of tracks to guide movement of the vehicle in the first direction (X) and a second set of wheels for engaging with the second set of tracks to guide movement of the vehicle in the second direction (Y), wherein the first set of wheels and/or the second set of wheels is vertically displaceable by displacement means arranged within the vehicle body.

The invention also relates to a vehicle suitable for lifting and moving storage containers stacked in stacks within an automated storage and retrieval system in accordance with the system described above. The vehicle is configured to move on the track system above the storage columns and comprises a vehicle body and a wheel assembly rotatably connected to the vehicle body in order to guide the vehicle along the track system in the first direction (X), the second direction (Y) or both directions. The vehicle further comprises a container picking device for releasably attaching to a storage container. The container picking device comprises a pivot arm comprising a first end pivotally connected to the vehicle body at pivot point (PP) and a second, distal end. The configuration of the container picking device is such that it is movable in a pivoting motion of the pivot arm about the pivot point between a first, lifting position enabling the container picking device to lift at least one storage container from a position outside the horizontal extent of the vehicle body and a second, transport position enabling the container picking device to hold the at least one storage container at least partly inside the horizontal extent of the vehicle body.

The invention also relates to a method of operating an automated storage and retrieval system, preferably a system as described above. The system comprises a three-dimensional grid comprising a plurality of storage columns in which storage containers are stacked one on top of another in vertical stacks, and a port zone which comprises at least one port, allowing transfer of storage containers out of and/or into the grid. The system further comprises a plurality of first vehicles which are operated laterally on the grid for retrieving one or more storage containers from, and storing one or more storage containers in, the storage columns, and for transporting the storage containers laterally across the grid. The method according to the invention comprises the steps of:

arranging, in the grid, a transfer zone comprising a plurality of transfer columns for temporarily storing storage containers when in transit between the storage columns and the at least one port;

utilizing the first vehicles to transport the storage containers between the storage columns and the transfer columns; and utilizing a plurality of second vehicles which are operated on the grid to transport the storage containers between the transfer columns and the at least one port.

For use in the method, each of the plurality of second vehicles comprises a vehicle body, a wheel assembly connected to the vehicle body and configured to guide the second vehicle along the track system in the first direction (X) and/or the second direction (Y), a container picking device for releasably attaching to a storage container within the transfer zone comprising a pivot arm comprising a first end pivotally connected to the vehicle body at pivot point (PP) and a second, distal end. The configuration of the container picking device is such that it is movable in a pivoting motion of the pivot arm about the pivot point between a first, lifting position enabling the container picking device to lift at least one storage container from a position outside the horizontal extent of the vehicle body and a second, transport position enabling the container picking device to hold the at least one storage container at least partly inside the horizontal extent of the vehicle body.

In the following, numerous specific details are introduced by way of example only to provide a thorough understanding of embodiments of the claimed system, vehicle and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

BRIEF DESCRIPTION OF THE DRAWINGS

Following drawings are appended to facilitate the understanding of the invention.

FIG. 1 is a perspective view of a grid of a prior art automated storage and retrieval system.

FIG. 2 is a perspective view of a prior art container handling vehicle.

FIGS. 10(a) and (b) are side views of the vehicle of FIG. 6 illustrating schematically two different means for attaching a storage container to the vehicle.

In the drawings, like reference numerals have been used to indicate like parts, elements or features unless otherwise explicitly stated or implicitly understood from the context.

DETAILED DESCRIPTION OF THE INVENTION

Figure 3:
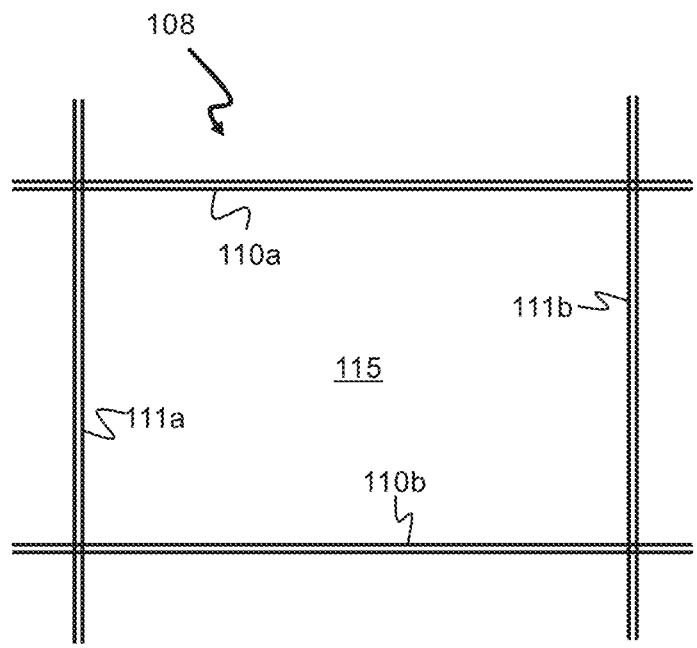
FIG. 3 is a top view of a prior art single rail grid.

In the following, embodiments of the invention will be discussed in more detail with reference to the appended drawings. It should be understood, however, that the drawings are not intended to limit the invention to the subject-matter depicted in the drawings.

Figure 12:
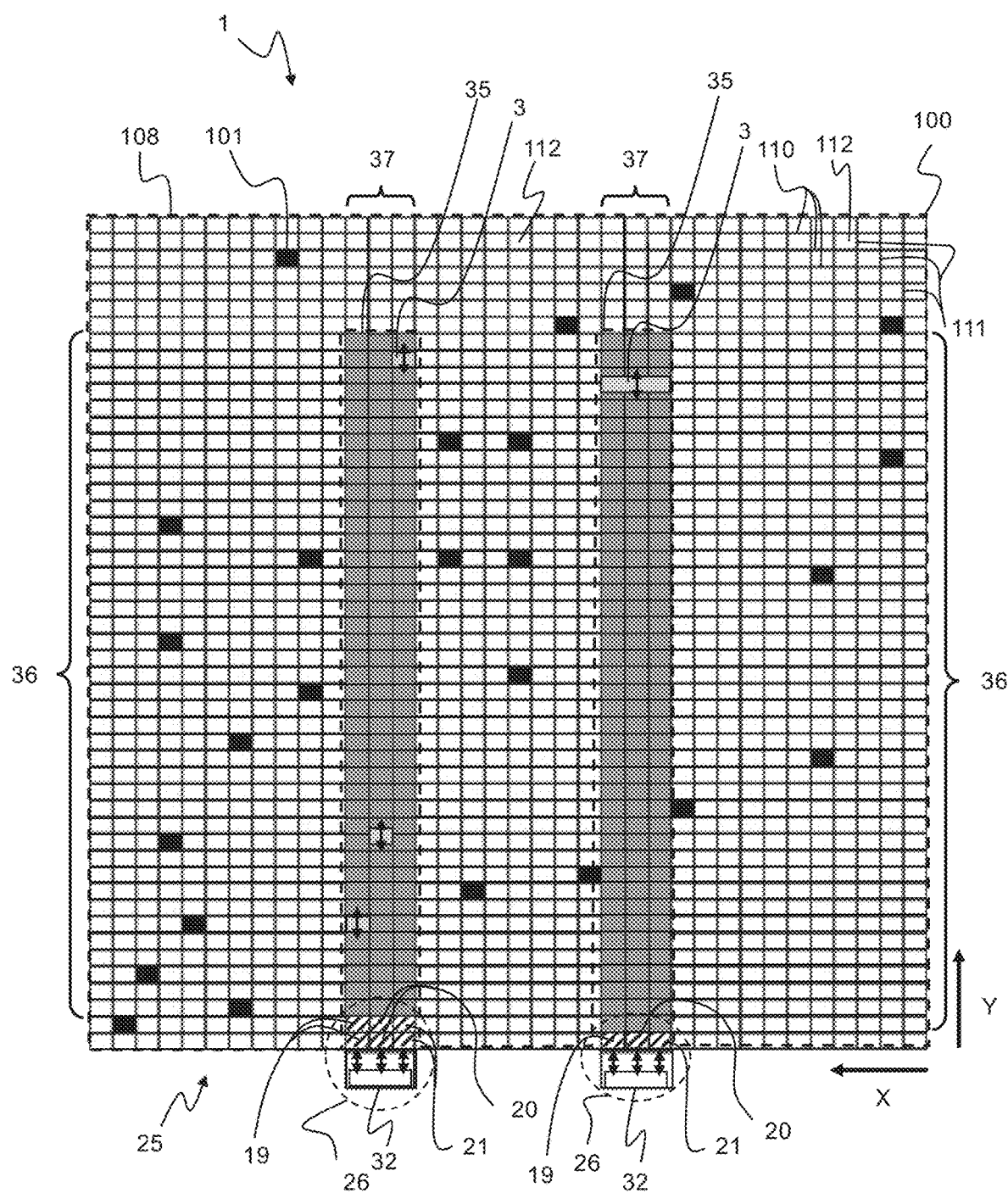
FIG. 12 is a top view of grid of an automated storage and retrieval system according to one embodiment of the invention.
Figure 13:
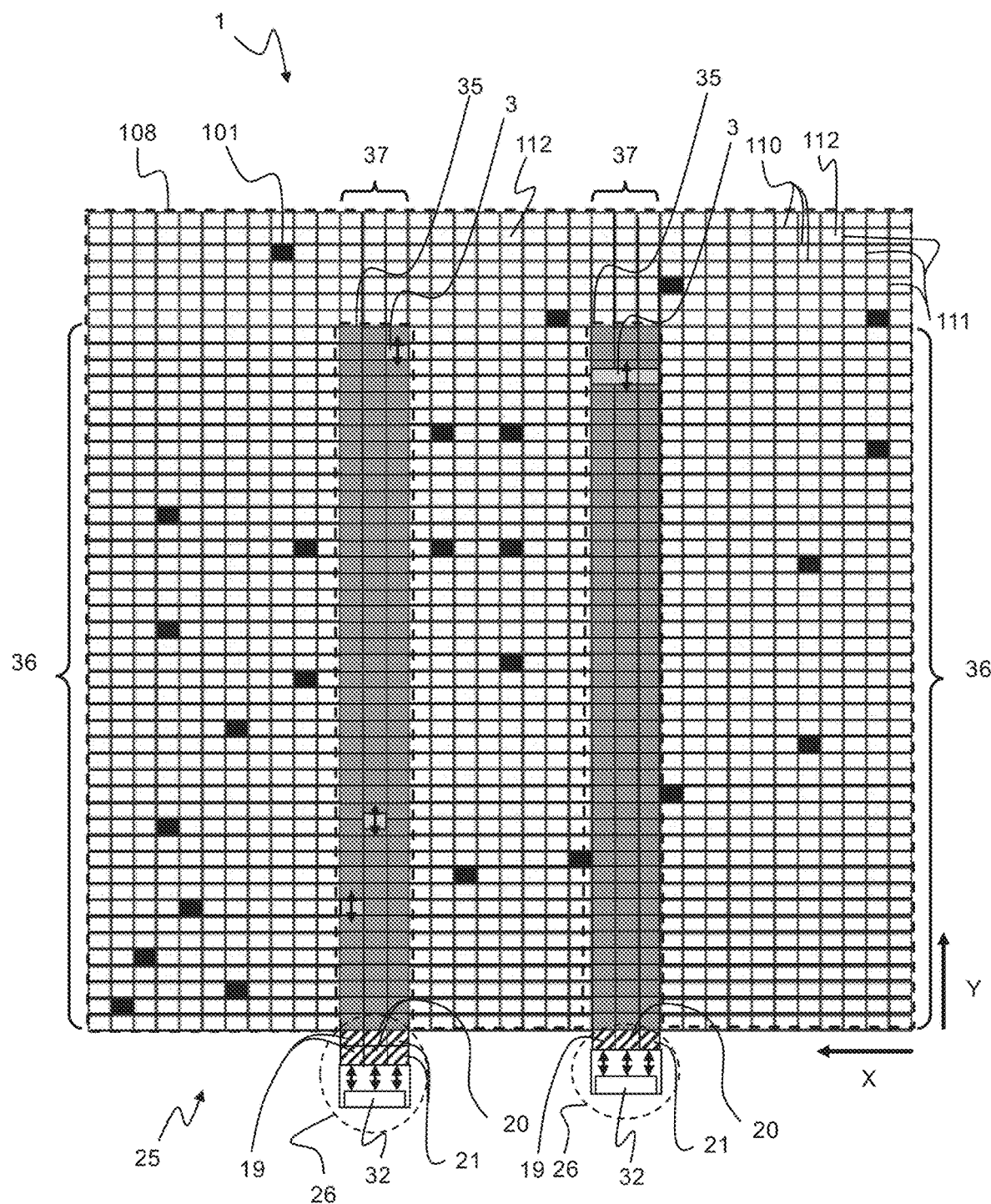
FIG. 13 is a top view of grid of an automated storage and retrieval system according to a second embodiment of the invention.
Figure 14:
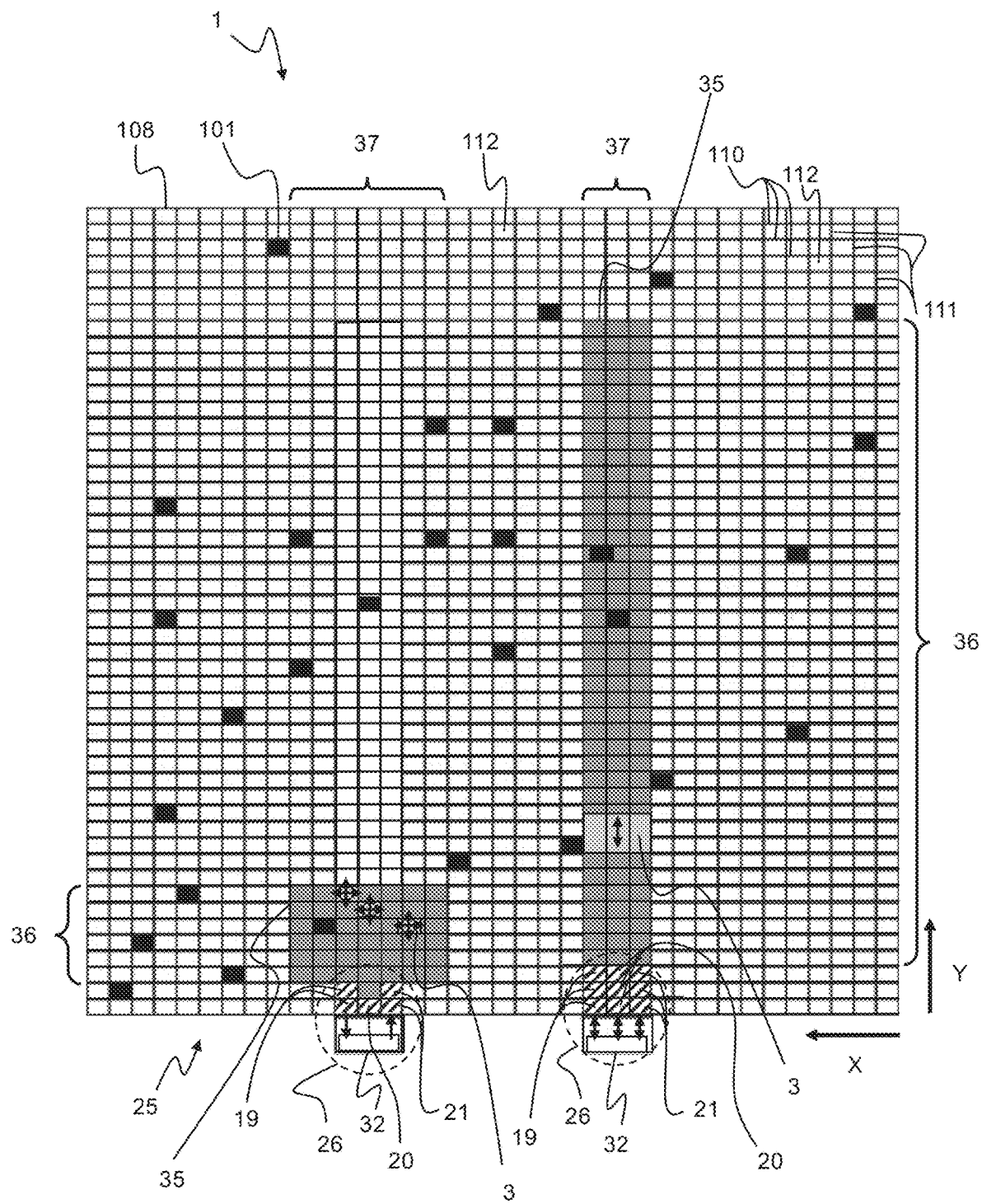
FIG. 14 is a top view of grid of an automated storage and retrieval system according to a third embodiment of the invention.

Particular embodiments of a storage structure of an automated storage and retrieval system 1 are shown in FIGS. 12, 13 and 14 in top views. The storage grid 104 of each storage structure constitutes a framework 100 of in total 1800 grid columns 112, where the width and length of the framework corresponds to the width and length of 36 and 50 grid columns 112, respectively. The top layer of the framework 100 is a track system 108 onto which a plurality of vehicles 3,101 are operated. FIGS. 12 and 13 shows two types of vehicles 3,101, indicated by black and light grey rectangles. The black rectangles symbolize exemplary positions of container handling vehicles 101 intended to transport storage containers 106 to and from their respective grid columns 112 within the framework 100 (white area), while light grey rectangles symbolize exemplary positions of port access vehicles 3 (see FIGS. 5-10) intended to transport the picked storage containers 106 between temporary storage positions within a transfer zone 35 of the framework 100 (dark grey area) and a port zone 26 containing one or more container ports 19-21 (area framed by a dotted circle).

Figure 4:
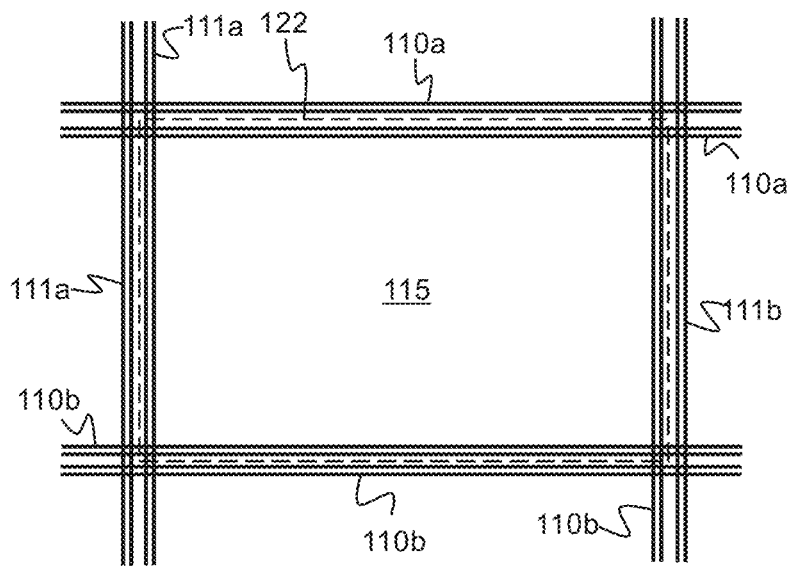
FIG. 4 is a top view of a prior art double rail grid.

If not otherwise stated, the framework 100 of the automated storage and retrieval system 1 is constructed in accordance with the prior art framework 100 described above in connection with FIGS. 1-4, i.e. a plurality of upright members 102 and a plurality of horizontal members 103 which are supported by the upright members 103, and further that the horizontal members 103 comprise the track system 108 of parallel tracks 110,111 in X direction and Y direction arranged across the top of storage columns 105/grid columns 112. The horizontal area of a grid column 112, i.e. along the X and Y directions, may be defined by the distance between adjacent rails 110 and 111, respectively (see also FIGS. 3 and 4).

Consequently, the track system 108 allows the container handling vehicles 101 and the port access vehicles 3 to move horizontally between different grid locations, where each grid location is associated with a grid column 112. In the embodiments shown in FIGS. 12 and 13 the movement of each port access vehicle 3 is restricted to the X direction only, while FIG. 14 shows an embodiment where the port access vehicles 3 are configured to move both in X direction and in Y direction, hence having the same mobility on the track system 108 as the container handling vehicle 101.

In FIG. 1 the grid 104 is shown with a height of eight cells. It is understood, however, that the grid 104 in principle can be of any size. In particular it is understood that grid 104 can be considerably wider and/or longer than disclosed in FIGS. 12-14. For example, the grid 104 may have a horizontal extension of more than 700×700 grid cells. Also, the grid 104 can be considerably deeper than disclosed in FIG. 1. For example, the grid 104 may be more than twelve grid cells deep.

The storage container vehicles 101 may be of any type known in the art, e.g. any one of the automated container handling vehicles disclosed in WO2014/090684 A1, in NO317366 or in WO2015/193278A1 (FIG. 2). In the embodiments shown in FIGS. 12-14 storage container vehicles 101 of the type disclosed in WO2015/193278A1 is assumed, i.e. storage container vehicles 101 displaying a centrally located storage space for receiving and stowing a storage container 106 and for transport horizontally across the grid 104, and a footprint, i.e. an extension in the X and Y directions which is generally equal the horizontal extension of a grid column 112. This particular configuration will allow a storage container vehicle 101 to transport a storage container 106 above a row of grid columns 112 even if another storage container vehicle occupies a location above a grid column neighboring the grid column row along which the first storage container vehicle 101 is traveling.

In the embodiments disclosed in FIGS. 12-14, the framework 100 comprise a storage zone 25, two port zones 26 and two transfer or buffer zones 35. The size and number of both transfer zones 35 and port zones 26 may vary according to need. While the size and position of the port zones 26 normally are fixed, the size and position of the transfer zones 35 may be dynamic and set by the software controlling the storage container vehicles 101 and/or the port access vehicles 3. The grid constituting the transfer zone 35 is preferably constructed identical to the grid constituting the storage zone 25. Alternative solutions may of course be envisaged such as special grid cells within a transfer zone 35 being only one cell deep (Z=1) or a transfer zone 35 where the storage containers 106 may be placed only on top (Z=0) of the track system 108.

In the example shown in FIG. 12, the framework 100 comprises a storage zone 25 (white area), two port zones 26 (areas enclosed by dotted circles) and two transfer zones 35. Each port zone 26, which is for example three grid cells wide in the X direction and two grid cells long in the Y direction, as for the left port zone, or three grid cells wide in the X direction and one grid cell long in the Y direction, as for the right port zone, comprises ports 19-21 where storage containers 106 can be transferred out of or into the framework 100. The left transfer zone 35, linked to the left port zone 26, is three grid cells wide in the X direction and 41 grid cells long in the Y direction, while the right transfer zone 35, linked to the right port zone 26, is three grid cells wide and 42 grid cells long. The storage zone 25, which makes up the rest of the framework 100, comprises storage columns 105 in which storage containers 106 or bins can be stacked one on top of another to form stacks 107.

A second example of an automated storage and retrieval system 1 is shown in FIG. 13. The system 1 is similar to the example shown in FIG. 12, but all columns constituting the ports 19-21 within the port zones 26 are situated fully outside the 36×50 framework 100. The left and right transfer zones 35 are slightly longer, 43 grid cells 36 for both.

For the systems 1 shown in both FIG. 12 and FIG. 13, the vehicles 3 dedicated for transporting storage containers 106 between the transfer zone(s) 35 and the port zone(s) 26 includes a drive system 18 comprising wheels 18a enabling movements of the vehicles in the X direction only.

Figure 5:
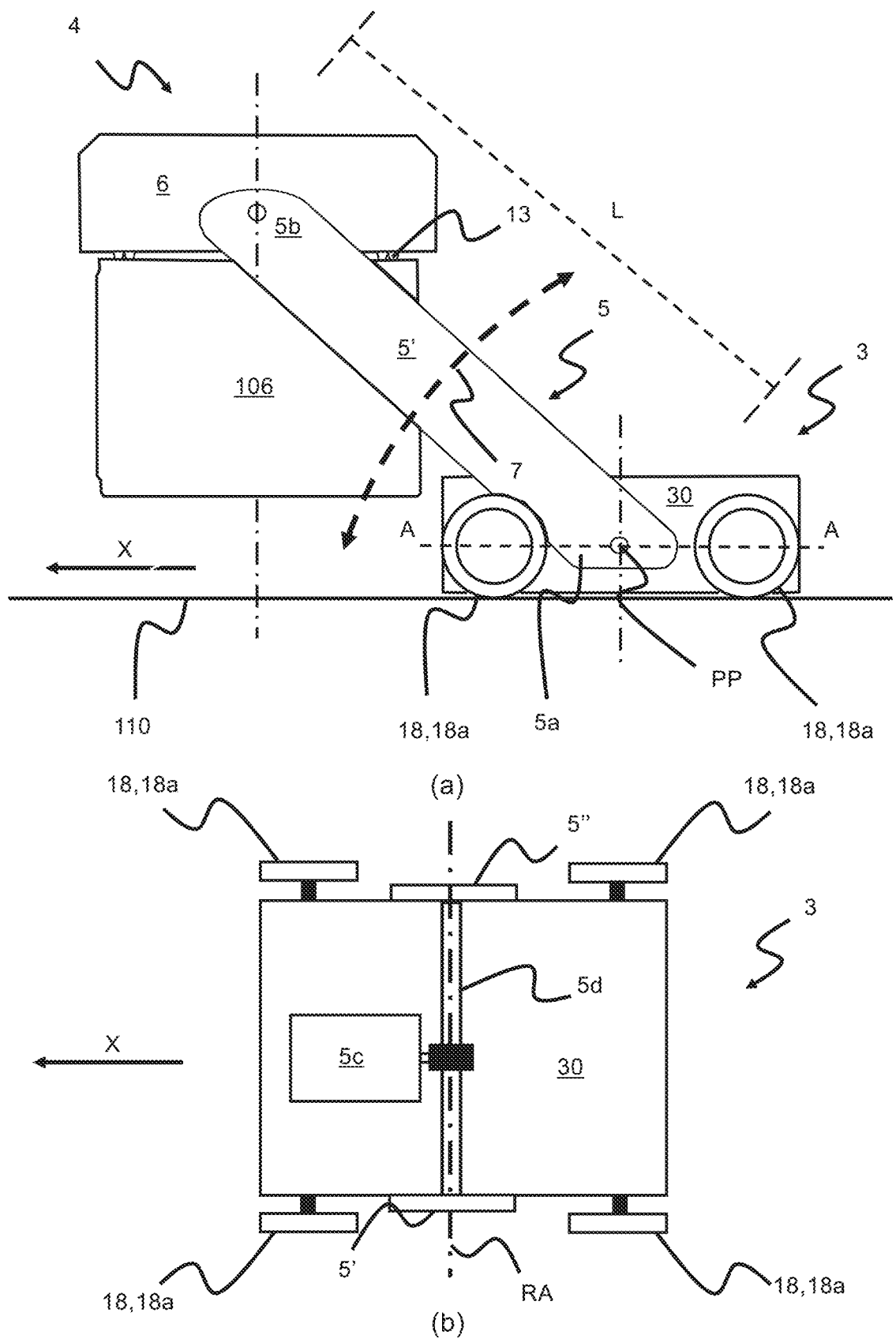
FIGS. 5(a) and (b) is a side view and a top view of a vehicle according to one embodiment of the invention.

An example of such an one way vehicle 3 is illustrated in FIG. 5, where FIG. 5(a) is a side view of the vehicle 3 and FIG. 5(b) is a cross section view of the vehicle 3 through the horizontal plane marked A-A, respectively. As is apparent from FIG. 5(a) the vehicle 3 comprises two pivot arms 5',5" having length L, where one longitudinal end 5a of each pivot arm 5',5" is pivotally attached to each side of a vehicle body 30 of the vehicle 3 at pivot points PP, thereby allowing the arms 5',5" to pivot around the pivot points (double arrow) 7 in a vertical plane along the X direction. The length L is herein defined as the length of a pivot arm 5',5" from its pivot point PP on the vehicle body 30 to the termination point at the other longitudinal end 5b. The pendulum movements 7 may be activated and maintained by use of a pivot arm motor 5c providing the necessary pivoting torque, either directly onto the arms 5',5" or via a pivot arm shaft 5d connected at the pivot points PP of the two pivot arms 5',5". It is understood however that any means for creating a torque on the arms 5,5' at their pivot points PP, and/or any force directed perpendicular to the longitudinal direction of the arms 5,5', may be used to ensure the pendulum movements 7.

Even though two pivot arms 5',5" are illustrated in FIG. 5, it should be understood that the vehicle 3 can be equipped with only one pivot arm 5' pivotally attached in any location of the vehicle body 30, for example in the gravitational center point of the vehicle body 30.

The other, distal end 5b of each pivot arm 5',5" is equipped with means for picking up storage containers 106. The releasable coupling with the storage containers 106 may be achieved using the pivot arms 5',5" only, e.g. by exerting pressure onto the side of the storage container 106 and/or providing the distal ends 5b with one or more gripping devices 13 (clips, hoods, etc.). However, in a preferred embodiment, and as illustrated in FIG. 5(a), the distal ends 5b are pivotally attached to a lifting unit 6, in FIG. 5a depicted in the form of a cuboid having said gripping device(s) 13 arranged beneath, i.e. on the side of the lifting device 6 facing the underlying framework 100.

The port access vehicle 3 in FIG. 5 is illustrated with one set of wheels 18a directed in X direction only. Hence, the vehicle 3 may in this particular example move only in one direction on the framework 100. As will be further explained later with reference to FIGS. 8 and 9, the vehicle 3 may alternatively, or in addition, be equipped with a second set of wheels 18b directed in the Y direction.

A possible modification of the example shown in FIG. 5 is to replace the pivot arms 5',5" of fixed length L with telescopic pivot arms (not shown), i.e. pivot arms which length may vary between a minimum length $L_{min}$ and a maximum length $L_{max}$. One advantage of such a telescopic solution is that storage containers 106 situated further away from the vehicle body 30 may be picked up by the vehicle 3. Furthermore, a telescopic solution represents one example of a solution which renders picking of storage containers 106 in both X direction and Y direction possible. For example, the vehicle 3 may be equipped with a second pair of pivot arms pivotally attached to the vehicle body 30 and directed in the Y direction. In order to allow one or more storage containers picked up by the second pair of pivot arms to be arranged in a transport position, i.e. at least partly above the vehicle body 30, the first pair of pivot arms 5',5" can be fully retracted, thereby avoiding any interference with the second pair of pivot arms.

If a lifting unit 6 is present, the fully retracted position of the pivot arms 5',5" could be in a position where the lower face of the lifting device 6 abuts, or almost abuts, the upper face of the vehicle body 30. In this configuration, the second pair of pivot arms should be long enough to allow arrangement of the at least one storage container at least partly above the lifting unit 6.

To ensure maximum pivotal movements of the pivot arms 5',5" the horizontal arrangement of the wheels constituting the wheel assembly 18 and the horizontal arrangement of the pivot arms 5',5" may be such that the pivot arms 5,5" are movable between each wheel and the vehicle body 30, as illustrated in FIG. 5(b). This particular arrangement, which represent an addition or an alternative to the configuration with recesses mentioned above, also ensures better stability of the pivoting operation due to the guiding effect from both the vehicle body 30 and the wheels.

FIG. 6(a)-(c) shows a port access vehicle 3 according to a second embodiment of the invention, where two mutually parallel pivot arms 5',5" are pivotally attached to each side walls of the vehicle body 30 directed in the X direction, thereby achieving higher stability during storage container handling. FIG. 6(a) and FIG. 6(c) show the port access vehicle 3 in a picking position, that is, the position where the pivot arms 5',5" have an angle relative to the horizontal plane (P) causing the picked storage container 106 to be located fully outside the horizontal extent of the vehicle body 3. FIG. 6(b) shows the port access vehicle 3 in a transport position, that is, the position where the pivot arms 5',5" have an angle relative to the horizontal plane (P) causing the picked storage container 106 to be located at least partly within the horizontal extent of the vehicle body 3.

In addition to the two mutually, parallel pivot arms 5',5", the design of the vehicle body 30 of the second embodiment vehicle 3 is different from the cuboid form for the first embodiment vehicle 3 shown in FIG. 5. The vehicle body 30 of the second embodiment vehicle 3 may be divided into a lower part 30a and an upper part 30b, where the lower part 30a has a cuboid shape as for the entire vehicle body in FIG. 5 and the upper part 30b has a wedged rectangular shape where the planes in at least the Y direction are upwardly inclined towards the center of the vehicle body 30. The upper part may for example provide additional space for vehicle components such as motors. The inclination may be of any form such as linear or curved. A domed profile may also be envisaged. For all embodiments, the maximum height of the vehicle body 30 may be 40% of the horizontal length of the underlying storage cell in the X direction or in the Y direction.

As for the first embodiment vehicle 3, the pivot arms 5',5" may have a fixed length L or be telescopic.

Figure 7:
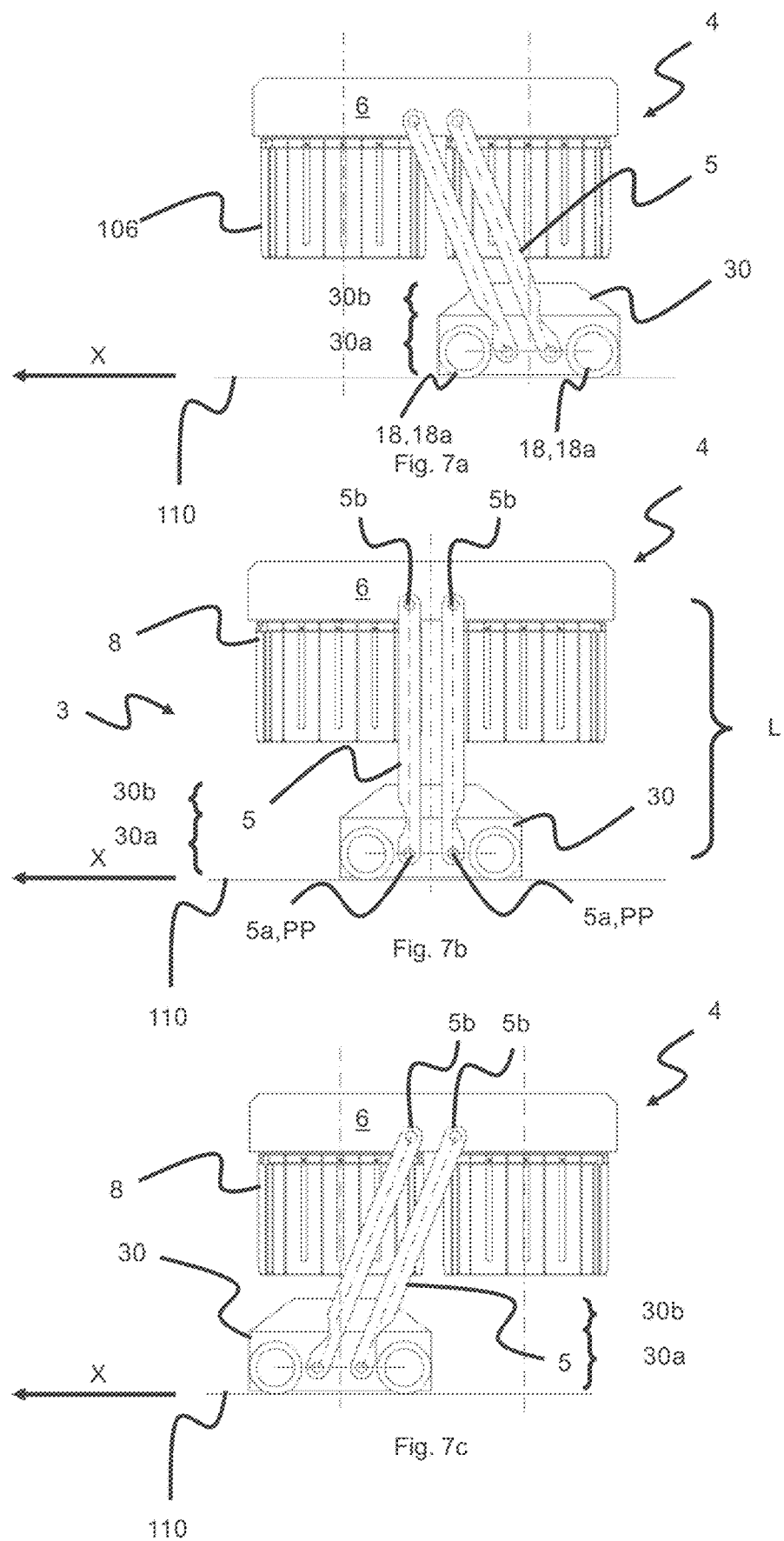
FIGS. 7(a)-(c) are side views of a vehicle according to a third embodiment of the invention.

FIG. 7 (a)-(c) shows a third embodiment vehicle 3 configured to allow picking of a plurality of storage containers

106 in the same operation. In the third embodiment this is achieved by attaching the distal ends 5*b* of the pivot arms 5',5" to a multiple container lifting unit 6. FIG. 7 shows an example where the lifting unit 6 is configured to lift two neighboring storage containers 106 in the X direction. However, the multiple container lifting unit 6 may be configured to handle any set of storage containers, for example 3×1 storage containers, 3×2 storage containers, 2×2 storage containers or 3×3 storage container. One could also envisage a reconfigurable lifting unit such as a telescopic and/or foldable lifting unit capable of for example change the capacity between a single storage container lifting unit and a 2×1 storage container lifting unit. Further, the container picking device 4 may may comprise two pivoting picking device parts, each having a lifting unit 6. In such configuration one set of pivot arms constituting part of the first picking device part pivots one container and the other set of pivot arms constituting part of the second picking device part pivots another container. With two pivoting picking device parts the first may pivot forward and the other may pivot backwards, thereby balancing the weights during operation of containers. In order to ensure that the pivot arms move in an equal but opposite direction, it may be advantageous to install a coq system at one or more pivot points. Such a cog system may be installed for all embodiments.

Figure 6:
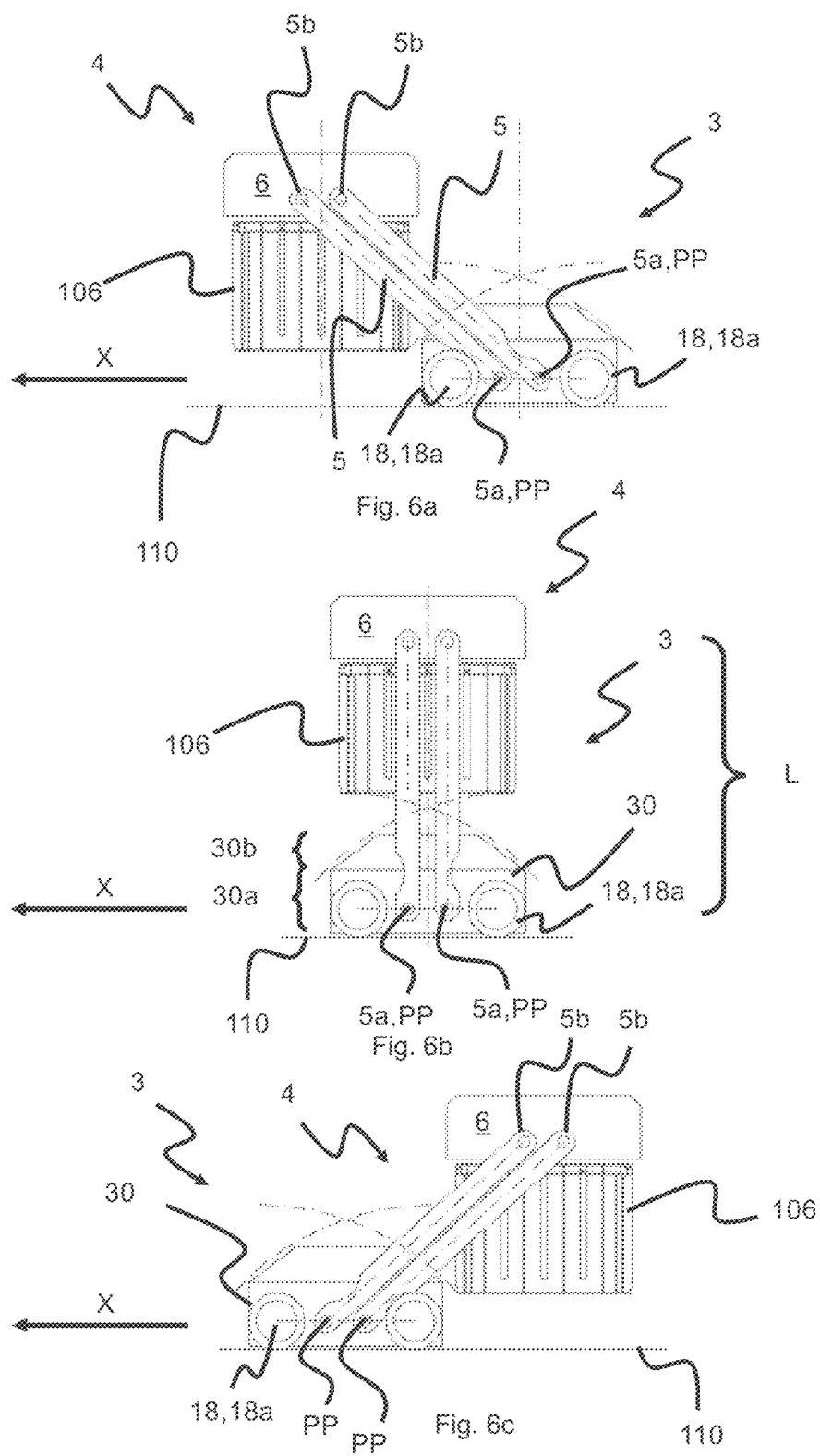
FIGS. 6(a)-(c) are side views of a vehicle according to a second embodiment of the invention.

Apart from the lifting unit 6, the third embodiment vehicle 3 shown in FIG. 7 is identical to the second embodiment vehicle 3 shown in FIG. 6. And as in FIG. 6, FIGS. 7(*a*) and 7(*c*) shows the vehicle 3 in a picking position, while FIG. 7(*b*) shows the vehicle 3 in a transport position.

The third embodiment vehicle 3 is configured to move on the track system 108 in the X direction only. However, as will be described with reference to FIG. 9, the third embodiment vehicle 3 may be configured to move on the track system 108 in the X direction or the Y direction.

Figure 8:
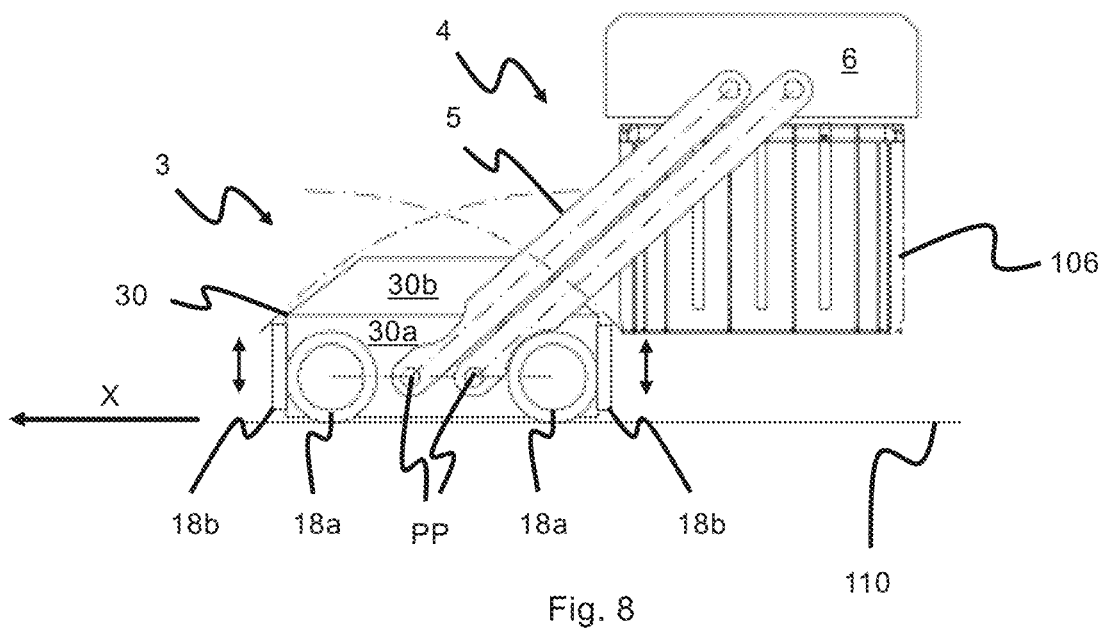
FIG. 8 is a side view of a vehicle according to a fourth embodiment of the invention.
Figure 9:
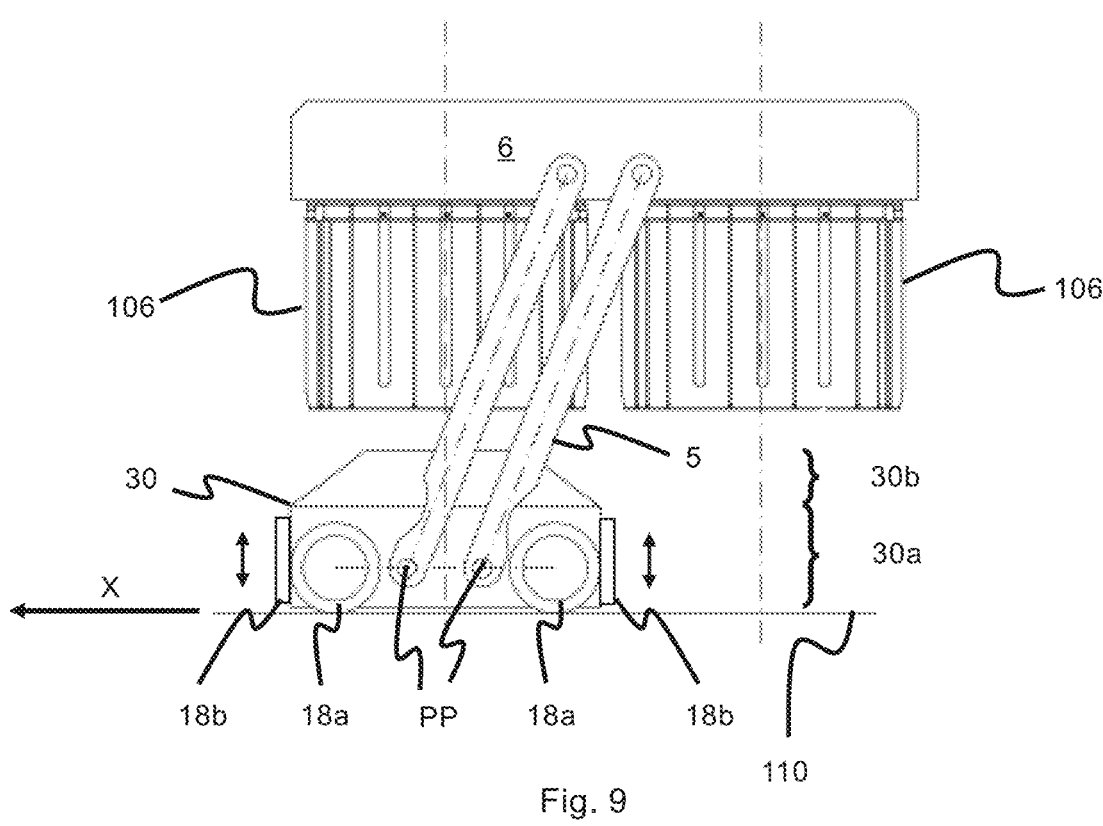
FIG. 9 is a side view of a vehicle according to a fifth embodiment of the invention.

FIGS. 8 and 9 show the above-mentioned configurations of the vehicle 3, but where a second set of wheels 18*b* for moving the vehicle 3 in the Y direction is added to the wheel assembly 18. In order to enable change of direction between X direction and Y direction one or both of the sets of wheels 18*a*,18*b* should be made vertically displaceable, for example by arranging vertical displacement means within or onto the vehicle body 30. The alternative of adding wheels to enable movement in the Y direction in addition to the wheels for movement in the X direction, may be implemented for all embodiments shown in FIGS. 5-7.

At least one of the wheels in each set 18*a*, 18*b* is motorized in order to propel the vehicle 3 along the track system 108. Advantageously, At least one wheel of each or both sets may comprise a hub motor i.e. an electric motor that is coupled to, or incorporated into, the hub of a wheel and drives the wheel directly. An example of a vehicle with such a motor is disclosed in WO2016/120075A1, the contents of which are incorporated herein by reference.

The storage containers 106 may be picked and lowered by the vehicle 3 in various ways of which two exemplary configurations are shown in FIG. 10.

In FIG. 10 (*a*) the gripping device/engagement device 13 for gripping/engaging a storage container 106 is shown in form of clips arranged in or near each of the four corners on the horizontal plane of the lifting unit 6 facing the underlying framework 100. The pivot arms 5',5" pivots until the gripping device 13 is within reach of a dedicated gripping device structure on or within the storage container 106. The gripping device 13 then grips the storage container 106, and the pivot arms 5',5" pivot back until the vehicle 3 is in a transport position, for example with the pivot arms 5',5" directed perpendicular to the horizontal plane (P).

In FIG. 10 (*b*) the gripping device 13 for gripping a storage container 106 is shown in form of clips arranged under a lifting plate 22 suspended at the lifting unit 6 by a storage container lift mechanism 16. The lift mechanism 16 may for example be identical to the vehicle lifting device disclosed in WO 2015/193278 A1, the contents of which are incorporated herein by reference, thereby allowing the vehicle 3 to lift/lower storage containers 106 from/to stacks 107 below the track system 108. A lifting motor 40 (FIG. 5) for lowering and raising the lifting plate 22 may be arranged within the lifting unit 6 or within the vehicle body 30, thereby enabling control of the position of the lifting plate 22 with respect to the lifting unit 6 in the third direction Z.

Figure 11:
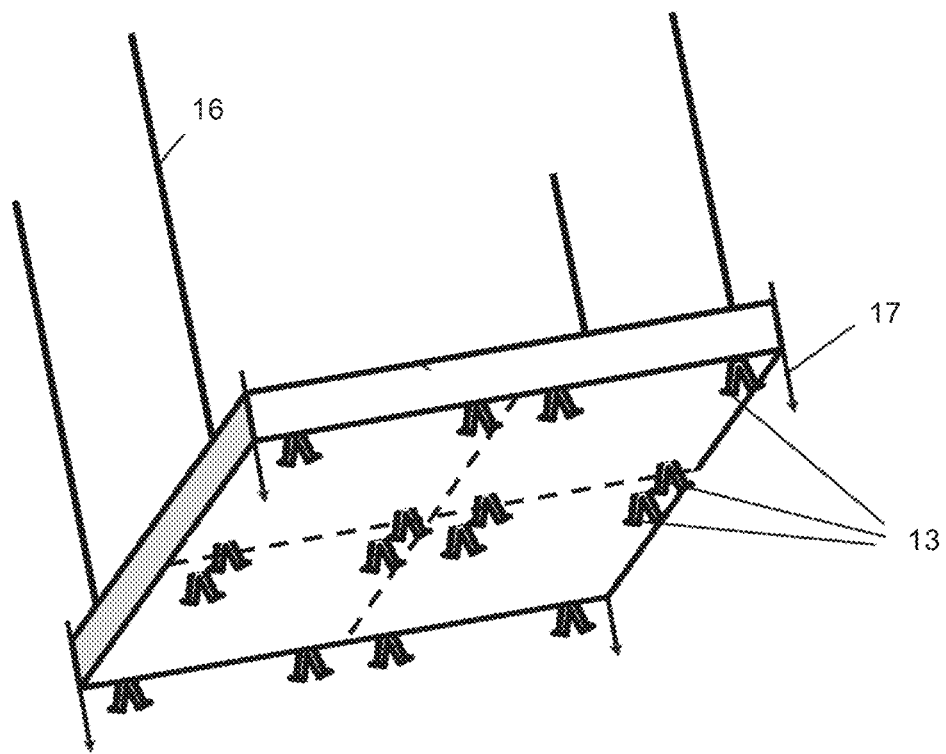
FIG. 11 is a perspective view of a lifting device capable of lifting a plurality of storage containers in one lifting operation.

For handling a plurality of storage containers 106, as disclosed above with reference to FIG. 7, the gripping device 13 may comprise a number clips that corresponds to the total number of upper horizontal corner of the storage containers 106 to be picked by the vehicle 3 in the same picking operation. FIG. 11 shows an example of 4×4 clips allowing up to four storage containers 106 to be picked in the same operation. Each, some or all the clips in each lifting unit 6 may be remotely operated by a control system. In FIG. 11 the gripping device 13 is shown arranged on a lifting plate 22. However, the same or a similar gripping device 13 solution with four times the number of storage containers 106 to be picked may be arranged on the lifting unit 6 as depicted in FIG. 10(*a*). Each corner of the lower face of the lifting plate 22, or each corner of the lower plane of the lifting unit 6, is preferably arranged with one or more steering pins 17 to ensure adequate guiding of the gripping device 13 into the gripping device receiving structure.

FIG. 14 shows a third example of an automated storage and retrieval system 1. As for the system 1 in FIG. 12, the port columns 19,20 are situated fully within the 36×50 framework 100. The left transfer zone 35 is in this example of size 7×6 storage cells 122 and the port access vehicles 3 for transporting storage containers 106 between the transfer zone 35 and the port zone 26 are (as indicated with double arrows in X and Y directions) configured with wheel assembly/drive system 18 comprising a first set of wheels 18*a* enabling movements in the X direction and a second set of wheels 18*b* enabling movements in the Y direction. Even if the port access vehicle 3 are illustrated as single cell vehicles capable of lifting a single storage container 106, it is to be understood that the port access vehicle 3 with drive system 18 for movements in both X and Y directions can be of any size capable of lifting any number of storage containers.

The right transfer zone 35 shows an example of a 3×40 storage cells operated by a single port access vehicle 3 covering 3×2 storage cells and capable of picking 3×2 storage containers 106 in one picking operation.

Again, with reference to FIGS. 12-14, when a storage container 106 stored in the storage grid 104 is to be accessed, one of the storage container vehicles 101 is instructed to retrieve the target storage container 106 from its position in the storage grid 104 and to transport the target storage container 104 to an access station 32 where it can be access from outside of the storage grid 104 or transferred out of the storage grid 104. This operation involves moving the storage container vehicle 101 to the grid cell 122 above the storage column 105 in which the target storage container 106 is positioned and retrieving the storage container 106 from the storage column 105 using the storage container vehicle's 101 lifting device (not shown). This step involves using the lifting device to lift the storage container 106 from the storage column 105 through the grid opening 115 of the grid cell 122 and into the storage space of the vehicle 101.

If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step may be performed with the same storage container vehicle 101 that is subsequently used for transporting the target storage container 101 to the access station 32, or with one or a plurality of other cooperating storage container vehicles 101. Alternatively, or in addition, the automated storage and retrieval system 1 may have vehicles specifically dedicated to the task of temporarily removing storage containers from a storage column 105. Once the target storage container 106 has been removed from the storage column 105, the temporarily removed storage containers can be repositioned into the original storage column 105. However, the removed storage containers may alternatively be relocated to other storage columns.

Once the target storage container 106 has been brought into the storage space of the storage container vehicle 101, the vehicle 101 transports the storage container 106 to the transfer zone 35 where it is unloaded into or on one of the storage columns 105. Each transfer zone 35 comprises transfer columns with length and width marked 36 and 37 in FIGS. 12-14, respectively, and is arranged to temporarily hold storage containers 106 when in transit between the storage zone 25 and the port zones 26. Since the number of storage columns 105 within a transfer zone 35 is larger than the number of available port columns 19-21, the likelihood of a container handling vehicle 101 not finding a vacant storage cell to deliver a storage container is low.

The port access vehicles 3 are operated on the track system 108 and have in the examples shown in FIGS. 12-14 a purpose to transfer storage containers 106 between the transfer zone 35 and the port zones 26. While the port access vehicles 3 are performing drop-off and pick up between the transfer zones 35 and the port zones 26, the storage container vehicles 101 may continue to transport storage containers 106 between the storage zone 25 and the transfer zones 35.

When the port access vehicle 3 has brought the target storage container 106 in the port zone 26, the picking device 4 of the vehicle 3 moves the container 106 above one of the port columns 19-21, for example a dedicated exit port column 19. The container 106 is then lowered into the chosen port column 19-21 and positioned on a conveyor or container lift (not shown) which transports the container 106 to the access station 32.

Once accessed at the access station 32, the target storage container 106 is transferred back into the grid 104 to once again be stored in the storage column 105 in the storage zone 25.

In the transfer zone 35 the storage containers 106 are advantageously stored on top of the track system 108 and/or in the uppermost layer of the grid 104, i.e. in the layer identified as Z=0 and Z=1, respectively. This will minimize the depth the picking device 4 of the port access vehicle 3 need to reach when dropping of and picking up storage containers 106 from the transfer zone 35, thereby allowing for rapid turnaround of the storage containers temporarily stored therein.

In order to allow the storage containers 106 to be temporarily stored onto the track system 108 (Z=0) and/or in the uppermost layer (Z=1) in the transfer zone 35, each storage columns within the transfer zone 35 may comprise stopping devices (not shown), e.g. clamps attached to the upright members 102 surrounding each transfer zone column, thereby preventing the storage container 106 from being lowered into the transfer zone column 36,37 beyond level Z=0 or Z=1. Of course, the clamps can be attached to the upright members deeper down the transfer zone columns, thus allowing the storage containers 106 to be temporarily stored at deeper levels. The desired depth of the storage containers 106 may also be achieved by filling the transfer zone columns with other, preferably void, storage containers. The storage container 106 to be stored is then placed on top of this stack.

The examples above have been describing systems using two types of vehicles 101,3, one storage container vehicle 101 for transporting storage containers 106 between a storage zone 25 and a transfer zone 35 and one port access vehicle 3 for transporting storage containers 106 between the transfer zone 35 and a port zone 26. However, the pivot arm equipped port access vehicles 3 could also be used as regular storage container vehicles, in particular if the vehicle 3 includes two set of wheels 18a,18b enabling movement in both X direction and Y direction, and more in particular if this two directional vehicle is configured such that storage containers 106 may be picked up from at least two perpendicular, lateral sides of the vehicle, for example all four lateral sides.

For monitoring and controlling the automated storage and retrieval system 1 so that a desired storage container 106 can be delivered to the desired location at the desired time without the vehicles 10,3 colliding with each other, the automated storage and retrieval system 1 comprises a control system (not shown), which typically is computerized and comprises a database for monitoring and controlling e.g. the location of the respective storage containers 106 within the storage grid 104, the content of each storage container 106 and the movement of the vehicles 101,3.

The vehicles 101,3 typically communicates with the control system via wireless communication means, e.g. via a WLAN operating under an IEEE 802.11 (WiFi) standard and/or via a mobile telecommunication technology such as 4G or higher.

Each vehicle 101,3 comprises a battery (not shown) which provides power to onboard equipment, including motorized wheels, lifting motor and onboard control and communications systems.

Patent Clauses:

The following clauses detail certain features of embodiments of the invention.

1. An automated storage and retrieval system (1) comprising:
   a track system (108) comprising a first set of parallel tracks (110) arranged in a horizontal plane (P) and extending in a first direction (X), and a second set of parallel tracks (111) arranged in the horizontal plane (P) and extending in a second direction (Y) which is orthogonal to the first direction (X), which first and second sets of tracks (110, 111) form a grid pattern in the horizontal plane (P) comprising a plurality of adjacent grid cells (122), each comprising a grid opening (115) defined by a pair of neighboring tracks (110a, 110b) of the first set of tracks (110) and a pair of neighboring tracks (111a, 111b) of the second set of tracks (111);
   a plurality of stacks (107) of storage containers (106) arranged in storage columns (105) located beneath the track system (108), wherein each storage column (105) is located vertically below a grid opening (115);

a vehicle (3) for lifting and moving storage containers (106) stacked in the stacks (107),
each vehicle (3) being configured to move on the track system (108) above the storage columns (105),
each vehicle (3) comprising
a vehicle body (30) and
a wheel assembly (18) connected to the vehicle body (30), the wheel assembly (18) being configured to guide the vehicle (3) along the track system (108) in at least one of the first direction (X) and the second direction (Y),
wherein the vehicle (3) further comprises:
a container picking device (4) for releasably attaching to a storage container (106) comprising a pivot arm (5) comprising a first end (5a) pivotally connected to the vehicle body (30) at a pivot point (PP),
wherein the container picking device (4), by means of a pivoting motion of the pivot arm (5) about the pivot point (PP), is movable between:
a first, lifting position enabling the container picking device (4) to lift at least one storage container (106) from a position beyond the horizontal extent of the vehicle body (30); and
a second, transport position enabling the container picking device (4) to hold the at least one storage container (106) at least partly inside the horizontal extent of the vehicle body (30).

2. The system (1) according to clause 1, wherein the container picking device (4) is configured such that the pivotal movement of the pivot arm (5) is restricted to a vertical plane oriented in the first direction (X).

3. The system (1) according to clause 1 or 2, wherein the container picking device (4) further comprises an attachment device (6) pivotally connected to the pivot arm (5), the attachment device (6) being configured to allow releasable attachment to the at least one storage container (106).

4. The system (1) according to clause 3, wherein the attachment device (6) further comprises an attachment body (6) pivotally connected to the pivot arm (5) and an engagement device (13) connected to the attachment body (6), for releasably engaging the at least one storage container (106).

5. The system (1) according to clause 3 and 4, wherein the attachment device (6) has a maximum horizontal extent covering at least the horizontal extent of a storage container (106) to be picked.

6. The system (1) according to clause 3, wherein the attachment device (6) further comprises an attachment body (6) pivotally connected to the pivot arm (5), wherein the attachment body (6) has a maximum horizontal extent covering at least the horizontal extent of a first storage container (106) and a second storage container (106) when the first and second storage containers are arranged adjacent to each other in the first direction (X) or the second direction (Y) and a gripping device (13) for releasably gripping at least the first and second storage containers (106).

7. The system (1) according to any one of the preceding clauses, wherein the container picking device (4) comprises
a first pivot arm (5') pivotally connected to a first side of the vehicle body (30) aligned in the first direction (X) and
a second pivot arm (5") pivotally connected to a second side of the vehicle body (30) aligned in the first direction (X).

8. The system according to clause 7, wherein the first and second pivot arms (5',5") are pivotally connected to respective side walls of the attachment body (6) aligned in the first direction (X).

9. The system (1) according to any one of the preceding clauses, wherein the container picking device (4) comprises
two mutually parallel first pivot arms (5') pivotally connected to a first side wall of the vehicle body (30) aligned in the first direction (X) and
two mutually parallel second pivot arms (5") pivotally connected to a second side wall of the vehicle body (30) aligned in the first direction (X).

10. The system (1) according to any one of the preceding clauses, wherein a footprint of the vehicle (3) defined as an extent of the vehicle in the first direction (X) and the second direction (Y), is equal to, or less than, the horizontal extent of a grid cell (122) of the underlying track system (108).

11. The system (1) according to clauses 1-9, wherein a footprint of the vehicle (3) defined as an extent of the vehicle in the first direction (X) and the second direction (Y), is equal to, or near equal to, the horizontal extent of a grid cell (122) of the underlying track system (108) times an integer of two or more.

12. The system (1) according to any one of the preceding clauses, wherein the wheel assembly (18) comprises a first set of wheels or first set of belts (18a) for engaging with the first set of tracks (110) to guide movement of the vehicle (3) in the first direction (X).

13. The system (1) according to clause 12, wherein the vehicle body (30) comprises
a lower part (30a) onto which the wheel assembly (18) is rotatably mounted and
an upper part (30b) located above the wheel assembly (18), wherein the upper part (30) is inclined inwards along the first direction (X).

14. The system (1) according to clause 12 or 13, wherein the vehicle body (30) comprises
a lower part (30a) onto which the wheel assembly (18) is rotatably mounted and
an upper part (30b) located above the wheel assembly (18), wherein the pivot point (PP) is located at the lower part (30a) of the vehicle body (30), in between two wheels of the first set of wheels (18a).

15. The system (1) according to any one of the preceding clauses, wherein the container picking device (4) further comprises
an attachment device (6) configured to allow releasable attachment to at least one storage container (106), the attachment device (6) comprising
an attachment body (6) pivotally connected to the pivot arm (5),
a storage container lift mechanism (16) connected to the attachment body (4), the storage container lift mechanism (16) being configured to raise and lower the at least one storage container (106) from a position on or within a grid column (112) to a position fully above the track system (108) and
a gripping device (13) arranged on the lower end of the storage container lift mechanism (16), the gripping device (13) being configured to releasably grip the at least one storage container (106).

16. The system (1) according to any one of the preceding clauses, wherein the wheel assembly (18) comprises a first set of wheels (18a) for engaging with the first set of tracks (110) to guide movement of the vehicle (3) in the first direction (X) and a second set of wheels (18b) for engaging with the second set of tracks (111) to guide movement of the vehicle (3) in the second direction (Y), wherein at least one of the first set of wheels (18a) and the second set of wheels (18b) is vertically displaceable by displacement means arranged within the vehicle body (30).

17. A vehicle (3) for lifting and moving storage containers (106) stacked in stacks (107) within an automated storage and retrieval system (1) in accordance with any of clauses 1-16, wherein the vehicle (3) is configured to move on the track system (108) above the storage columns (105) and comprises
    a vehicle body (30) and
    a wheel assembly (18) rotatably connected to the vehicle body (30), the wheel assembly (18) being configured to guide the vehicle (3) along the track system (108) in at least one of the first direction (X) and the second direction (Y),
    wherein the vehicles (3) comprises:
        a container picking device (4) for releasably attaching to a storage container (106) comprising a pivot arm (5) comprising a first end (5a) pivotally connected to the vehicle body (30) at pivot point (PP),
        wherein the container picking device (4), by means of a pivoting motion of the pivoting arm (5) about the pivot point (PP), is movable between:
            a first, lifting position enabling the container picking device (4) to lift at least one storage container (106) from a position outside the horizontal extent of the vehicle body (30); and
            a second, transport position enabling the container picking device (4) to hold the at least one storage container (106) at least partly inside the horizontal extent of the vehicle body (30).

18. A method of operating an automated storage and retrieval system (1) comprising:
    a three-dimensional grid (104) comprising a plurality of storage columns (105) in which storage containers (106) are stacked one on top of another in vertical stacks (107), and a port zone (26) which comprises at least one port (19-21) allowing transfer of storage containers (106) out of and/or into the grid (104);
    a plurality of first vehicles (101) which are operated laterally on the grid (104) for retrieving one or more storage containers (106) from, and storing one or more storage containers (106) in, the storage columns (105), and for transporting the storage containers (106) laterally across the grid (104);
    which method comprises the steps of:
        arranging, in the grid (104), a transfer zone (35) comprising a plurality of transfer columns (36, 37) for temporarily storing storage containers (106) when in transit between the storage columns (105) and the at least one port (19-21);
        utilizing the first vehicles (101) to transport the storage containers (106) between the storage columns (105) and the transfer columns (36, 37); and
        utilizing a plurality of second vehicles (3) which are operated on the grid (104) to transport the storage containers (106) between the transfer columns (36, 37) and the at least one port (19-21), wherein each of the plurality of second vehicles (3) comprises:
            a vehicle body (30),
            a wheel assembly (18) connected to the vehicle body (30), the wheel assembly (18) being configured to guide the second vehicle (3) along the track system (108) in at least one of the first direction (X) and the second direction (Y),
            a container picking device (4) for releasably attaching to a storage container (106) within the transfer zone (35) comprising a pivot arm (5) comprising a first end (5a) pivotally connected to the vehicle body (30) at pivot point (PP),
            wherein the container picking device (4), by means of a pivoting motion of the pivoting arm (5) about the pivot point (PP), is movable between:
                a first, lifting position enabling the container picking device (4) to lift at least one first storage container (106) from a position outside the horizontal extent of the vehicle body (30); and
                a second, transport position enabling the container picking device (4) to hold the at least one storage container (106) at least partly inside the horizontal extent of the vehicle body (30).

19. The method in accordance with clause 18, wherein the automated storage and retrieval system (1) is in accordance with any one of clauses 1-16.

In the preceding description, various aspects of an automated storage and retrieval system, a vehicle and a method according to the invention have been described with reference to the illustrative embodiment. However, this description is not intended to be construed in a limiting sense. Various modifications and variations of the illustrative embodiment, as well as other embodiments of the system, the vehicle and the method which are apparent to persons skilled in the art, are deemed to lie within the scope of the present invention as defined by the following claims.

REFERENCE NUMERALS

1 Storage and retrieval system
3 Vehicle/port access vehicle/second vehicle
4 Container picking device
5 Longitudinal pivot arm
5' First longitudinal pivot arm
5" Second longitudinal pivot arm
5a First end of the longitudinal pivot arm 5
5b Second, distal end of the longitudinal pivot arm 5
5c Pivot arm motor
5d Pivot arm shaft
6 Attachment device/lifting unit
13 Gripping device/engaging device/clips
16 Storage container lift mechanism
17 Steering pins/guiding pins
18 Wheel assembly of port access vehicle 3/drive system
18a First set of wheels, first direction
18b Second set of wheels, second direction
19 First port column/first port
20 Second port column/second port
21 Third port column/third port
22 Lifting plate
25 Grid storage zone
26 Port zone
30 Vehicle body of port access vehicle 3
32 Access station
35 Transfer zone
36 Left transfer zone columns
37 Mid transfer zone columns
38 Right transfer zone columns
40 Lifting motor for lowering/raising of lifting plate 22
100 Framework structure
101 Storage container vehicle/first vehicle 101a Vehicle body of the storage container vehicle 101
101b Drive means in first direction (X)
101c Drive means in second direction (Y)
102 Upright members of framework structure
103 Horizontal members of framework structure
104 Storage grid/three dimensional grid
105 Storage column
106 Storage container
106' Particular position of storage container
107 Stack
108 Rail system/track system
110 Parallel tracks in first direction (X)
110a First track of neighboring tracks 110
110b Second track of neighboring tracks 110
111 Parallel tracks in second direction (Y)
111a First track of neighboring tracks 111
111b Second track of neighboring tracks 111
112 Grid column
115 Grid opening
122 Footprint/grid cell/storage cell
X First direction
Y Second direction
P Horizontal plane
PP Pivot point
RA Rotational axis of pivot arm

What is claimed is:

1. An automated storage and retrieval system comprising:
a track system comprising a first set of parallel tracks arranged in a horizontal plane and extending in a first direction, and a second set of parallel tracks arranged in the horizontal plane and extending in a second direction which is orthogonal to the first direction, which first and second sets of tracks form a grid pattern in the horizontal plane comprising a plurality of adjacent grid cells, each comprising a grid opening defined by a pair of neighboring tracks of the first set of tracks and a pair of neighboring tracks of the second set of tracks;
a plurality of stacks of storage containers arranged in storage columns located beneath the track system, wherein each storage column is located vertically below a grid opening;
a vehicle for lifting and moving storage containers stacked in the stacks, each vehicle being configured to move on the track system above the storage columns, each vehicle comprising:
a vehicle body,
a wheel assembly connected to the vehicle body, the wheel assembly being configured to guide the vehicle along the track system in at least one of the first direction and the second direction and
a container picking device for releasably attaching to a storage container, wherein the container picking device comprises one or more arms and—wherein the container picking device is configured to be moveable between
a first lifting position enabling the container picking device to lift at least one storage container from a position beyond a horizontal extent of the vehicle body, and
a second, transport position enabling the container picking device to hold the at least one storage container at least partly within the horizontal extent of the vehicle body and above the vehicle body.

2. The system according to claim 1, wherein the container picking device comprises: a pivot arm comprising a first end pivotally connected to the vehicle body at a fixed or movable pivot point and a second distal end, wherein the container picking device is further configured such that it is movable in a pivoting motion of the pivot arm about the pivot point.

3. The system according to claim 2, wherein the container picking device is configured such that the pivotal motion of the pivot arm is restricted to a vertical plane oriented in the first direction.

4. The system according to claim 2, wherein the container picking device further comprises: an attachment device pivotally connected to the pivot arm, the attachment device being configured to allow releasable attachment to the at least one storage container.

5. The system according to claim 4, wherein the attachment device further comprises: an attachment body pivotally connected to the pivot arm and an engagement device connected to the attachment body, for releasably engaging the at least one storage container.

6. The system according to claim 4, wherein the attachment device further comprises:
an attachment body pivotally connected to the pivot arm, wherein the attachment body has a maximum horizontal extent covering at least the horizontal extent of a first storage container and a second storage container when the first and second storage containers are arranged adjacent to each other in the first direction or the second direction and
a gripping device for releasably gripping at least the first and second storage containers.

7. The system according to claim 1, wherein the container picking device comprises:
a first pivot arm pivotally connected to a first side of the vehicle body aligned in the first direction and
a second pivot arm pivotally connected to a second side of the vehicle body aligned in the first direction.

8. The system according to claim 1, wherein the container picking device comprises:
two mutually parallel first pivot arms pivotally connected to a first side wall of the vehicle body aligned in the first direction and two mutually parallel second pivot arms pivotally connected to a second side wall of the vehicle body aligned in the first direction.

9. The system according to claim 1, wherein a footprint of the vehicle defined as an extent of the vehicle in the first direction and the second direction, is equal to, or less than, the horizontal extent of a grid cell of the track system.

10. The system according to claim 1 wherein a footprint of the vehicle defined as an extent of the vehicle in the first direction and the second direction, is equal to, or near equal to, the horizontal extent of a grid cell of the track system times an integer of two or more.

11. The system according to claim 1, wherein the container picking device further comprises:
an attachment device configured to allow releasable attachment to at least one storage container, the attachment device comprising:
an attachment body pivotally connected to the one or more arms,
a storage container lift mechanism connected to the attachment body, the storage container lift mechanism being configured to raise and lower the at least one storage container from a position on or within a grid column to a position fully above the track system, and
a gripping device arranged on a lower end of the storage container lift mechanism, the gripping device being configured to releasably grip the at least one storage container.

12. The system according to claim 1, wherein the vehicle has a first footprint when the container picking device is in the first position and a second footprint when the container picking device is in the second position, and wherein the first footprint is larger than the first footprint in at least one of the first and/or second directions.

13. A vehicle for lifting and moving storage containers stacked in stacks within an automated storage and retrieval system comprises:
- a vehicle body; and
- a wheel assembly rotatably connected to the vehicle body, the wheel assembly being configured to guide the vehicle along a track system in at least one of a first direction and a second direction; and
- a container picking device for releasably attaching to a storage container comprising a pivot arm comprising a first end pivotally connected to the vehicle body at pivot point,
- wherein the container picking device, by means of a pivoting motion of the pivoting arm about the pivot point, is movable between:
- a first lifting position enabling the container picking device to lift at least one storage container from a position outside a horizontal extent of the vehicle body; and
- a second transport position enabling the container picking device to hold the at least one storage container at least partly inside the horizontal extent of the vehicle body,
- wherein the vehicle is configured to move on the track system above storage columns.

14. A method of operating an automated storage and retrieval system comprising:
- a three-dimensional grid comprising a plurality of storage columns in which storage containers are stacked one on top of another in vertical stacks, and a port zone which comprises at least one port allowing transfer of storage containers out of and/or into the grid;
- a plurality of first vehicles which are operated laterally on the grid for retrieving one or more storage containers from, and storing one or more storage containers in, the storage columns, and for transporting the storage containers laterally across the grid;
- wherein the method comprises:
  - arranging, in the grid, a transfer zone comprising a plurality of transfer columns for temporarily storing storage containers when in transit between the storage columns and the at least one port;
  - utilizing the first vehicles to transport the storage containers between the storage columns and the transfer columns; and
  - utilizing a plurality of second vehicles which are operated on the grid to transport the storage containers between the transfer columns and the at least one port, wherein each of the plurality of second vehicles comprises:
    - a vehicle body,
    - a wheel assembly connected to the vehicle body, the wheel assembly being configured to guide the second vehicle along a track system in at least one of a first direction and a second direction,
    - a container picking device for releasably attaching to a storage container within the transfer zone comprising a pivot arm comprising a first end pivotally connected to the vehicle body at pivot point,
  - wherein the container picking device, by means of a pivoting motion of the pivoting arm about the pivot point, is movable between:
  - a first, lifting position enabling the container picking device to lift at least one first storage container from a position outside a horizontal extent of the vehicle body; and
  - a second, transport position enabling the container picking device to hold the at least one storage container at least partly inside the horizontal extent of the vehicle body.

* * * * *